United States Patent [19]

Krakauer et al.

[11] Patent Number: 4,993,030
[45] Date of Patent: Feb. 12, 1991

[54] FILE SYSTEM FOR A PLURALITY OF STORAGE CLASSES

[75] Inventors: Arno S. Krakauer, San Jose; Dieter Gawlick, Palo Alto; John A. Colgrove, Mountain View; Richard B. Wilmot, II, Lafayette, all of Calif.

[73] Assignee: Amdahl Corporation, Sunnyvale, Calif.

[21] Appl. No.: 185,179

[22] Filed: Apr. 22, 1988

[51] Int. Cl.$^5$ .................... G11C 8/00; G06F 13/00; G06F 11/00
[52] U.S. Cl. .................... 371/40.1; 364/200; 364/243; 364/239; 364/238.4; 364/265; 364/964; 364/939; 364/926.92
[58] Field of Search .............. 364/200, 900; 371/51.1, 371/40.1

[56] References Cited

U.S. PATENT DOCUMENTS

| | | | |
|---|---|---|---|
| 4,148,098 | 4/1979 | McCreight | 364/200 |
| 4,215,400 | 7/1980 | Denko | 364/200 |
| 4,245,307 | 1/1981 | Kapeghian et al. | 364/200 |
| 4,399,503 | 8/1983 | Hawley | 364/200 |
| 4,453,211 | 6/1984 | Askinazi et al. | 364/200 |
| 4,731,724 | 3/1988 | Michel et al. | 364/200 |
| 4,761,785 | 8/1988 | Clark et al. | 371/51 |

FOREIGN PATENT DOCUMENTS

WO84/01451  4/1984  PCT Int'l Appl.

OTHER PUBLICATIONS

Patent Cooperation Treaty Search Report, U.S. International Searching Authority.
K. Salem et al., "Disk Striping", Dept. of EECS, Princeton Univ., Princeton, N.J. 08544; IEEE Conf. on Data Engineering, Feb. 1986.
S. Goldberg et al., "Data Security and Recovery Technique", IBM Technical Disclosure Bulletin, vol. 14, No. 11, Apr. 1972.
D. A. Patterson et al., "A Case for Redundant Arrays of Inexpensive Disks (RAID)", Rep. No. UCB/CSD87/391, Dec. 1987, Comp. Sci. Div. (EECS), Univ. of Cal., Berkeley, CA 94720.
M. Kim, "Synchronized Disk Interleaving", IEEE Transactions on Computers, vol. C-35, No. 11, Nov. 1986.
A. Park et al., "Providing-Fault Tolerance in Parallel Secondary Storage Systems", Dept. of Computer Science, Princeton Univ., Princeton, N.J., (CS-TR0-57-86), 11-7-86.

Primary Examiner—Gareth D. Shaw
Assistant Examiner—Gopal C. Ray
Attorney, Agent, or Firm—Fliesler, Dubb, Meyer & Lovejoy

[57] ABSTRACT

A file system for managing data files for access by a plurality of users of a data processing system that includes internal storage for buffering, external storage, and a file user interface by which the plurality of users request access to data files. A first level, coupled to the file user interface in the internal storage allocates the internal storage for temporary storage of data to be accessed by the plurality of users, and generates requests for transactions with external storage in support of such allocations. A second level is coupled to the first level and the external storage and responds to the request for transactions with the external storage for managing the transactions for storage of data to, and retrieval of data from, the external storage. The second level defines a plurality of physical storage classes which are characterized by pre-specified parameters that allocate data files subject of transactions to locations in external memory. In response to requests for transactions, the second level identifies one of the plurality of storage classes assigned to the data file subject of the transaction and carries out the transaction with the appropriate locations in external memory. At least one of the plurality of storage classes provides for utilization of a plurality of access paths in parallel for transactions involving data files assigned to such storage class. Further, at least one parameter pre-specified for storage classes identifies a level of reliability desired for the subject data files.

68 Claims, 20 Drawing Sheets

|        | P1    | P2    | P3    | P4    | P5    |
|--------|-------|-------|-------|-------|-------|
| CELL 1 | LC 1  | LC 2  | LC 3  | LC 4  | LC 5  |
| CELL 2 | LC 6  | LC 7  | LC 8  | LC 9  | LC 10 |
| CELL 3 | LC 11 | LC 12 | LC 13 | LC 14 | LC 15 |
| CELL 4 | LC 16 | LC 17 | LC 18 | LC 19 | LC 20 |

FIG.-6

AVAILABLE PATHS
LOGICAL DISKS

Pn = PATH n   Bn = BLOCK OR PAGE n
n = n         Xn = XOR OR PARITY BLOCK n

NO ECC
VIRTUAL MEMORY LAYOUT

USER SPACE

|    | B0–B9 | B10–B19 | B20–B29 | B30–B39 | B40–B49 |
|----|-------|---------|---------|---------|---------|
| C0 | B0–B9 | B10–B19 | B20–B29 | B30–B39 | B40–B49 |
| C1 | B50–B59 |       |         |         |         |
| C2 | B100–B109 |     |         |         |         |
| C3 | B150–B159 |     |         |         | B190–B199 |

FIG.-8

IDAW LISTS GENERATED

|    | C0 | C1 | C2 | C3 |
|----|----|----|----|----|
| P0 | B0–B9 | B50–B59 | B100–B109 | B150–B159 |
| P1 | B10–B19 | B60–B69 | B110–B119 | B160–B169 |
| P4 | B40–B49 | B90–B99 | B140–B149 | B190–B199 |

FIG.-9

DOUBLE ECC VIRTUAL MEMORY LAYOUT

USER SPACE

|    | | | | |
|----|---|---|---|---|
| C0 | B0–B9 | B10–B19 | B20–B29 | B30–B39 |
| C1 | B40–B49 | | | |
| C2 | B80–B89 | | | |
| C3 | B120–B129 | | | B150–B159 |

KERNEL SPACE

| X0–X9 | X40–X49 | X80–X89 |
|---|---|---|
| X10–X19 | X50–X59 | X90–X99 |
| X20–X29 | X60–X69 | X100–X109 |
| X30–X39 | X70–X79 | X110–X119 |

FIG.-14

IDAW LISTS GENERATED

|    | C0 | C1 | C2 | C3 |
|----|-----|-----|-----|-----|
| P0 | X0–X9 | X10–X19 | X20–X29 | X30–X39 |
| P1 | X40–X49 | X50–X59 | X60–X69 | X70–X79 |
| P2 | B0–B9 | B40–B49 | B80–B89 | B120–B129 |
| P3 | X80–X89 | X90–X99 | X100–X109 | X110–X119 |
| P4 | B10–B19 | B50–B59 | B90–B99 | B130–B139 |
| P5 | B20–B29 | B60–B69 | B100–B109 | B140–B149 |
| P6 | B30–B39 | B70–B79 | B110–B119 | B150–B159 |

FIG.-15

STR-PHYSIO-SETUP RAW I/O TO STRIPE DEVICE

GEN-ECC-GENERATE ANY ECC DATA NECESSARY

ROUTINE EX-OR DOES AN EXCLUSIVE OR FROM
ONE DATA AREA INTO ANOTHER

GEN-ECC2-GENERATE PARITY VALUES FOR
DOUBLE ERROR CORRECTION

FILE SYSTEM FOR A PLURALITY OF STORAGE CLASSES

BACKGROUND OF THE INVENTION

1. Limited Copyright Waiver

A portion of the disclosure of this patent document contains material to which the claim of copyright protection is made. The copyright owner has no objection to the facsimile reproduction by any person of the patent document or the patent disclosure, as it appears in the U.S. Patent and Trademark Office patent file or records, but reserves all other rights whatsoever.

2. Field of the Invention

The present invention relates to systems providing an interface and establishing access paths between users of data in a data processing system and facilities storing such data. In particular, the present invention provides a file system adaptable to optimize use of a plurality of access paths and available storage hardware to meet operational requirements of the system.

3. Description of Related Art

Computer systems are being developed in which the amount of data to be manipulated by the system is immense. For instance, data storage systems have been proposed that are capable of handling amounts of data on the order of exabytes, spread across hundreds of direct access storage devices (DASDs). Individual files for such systems have been proposed to be as high as ten gigabytes ($10^{10}$ bytes) Such large storage systems should be very reliable, since restoring an entire storage system after a crash could take many hours or days. In addition, these storage systems should sustain very high data transfer rates to allow for efficient use of the data. Further, it is desirable that there be no single point of failure which could cause such a large data system to go out of service. The requirements for size, speed and reliability of such data systems will continue to keep pace with increases in capacity of supercomputers at the high end, and with increasing numbers of large data storage systems being used by slower computers.

Prior art file systems which provide an interface between users of data, buffers in the computer system and external storage to the computer system, have operated by establishing a single access path for any individual request by a user to a file. This is absolutely reasonable as long as there are very few devices storing the data. But, in configurations with many storage devices and many independent access paths through which the data may be transferred in parallel in response to each individual request, the one access path per request limitation of system control programs greatly restricts the response time for a given task requiring transfer of data between external to internal storage.

Prior art file systems can be characterized with reference to the diagram shown in FIG. 1. The computer system in which the prior art file system runs would include a plurality of application programs A, corresponding to users of data. Some of the application programs will be part of processing subsystems (SS), such as database drivers and the like. These application programs A, or subsystems, will generate access requests through a user interface I, to the buffer space in the computer. If data required by a given transaction is not located in the buffer space, then the system control program SCP establishes an access path through device drivers by which the required data can be retrieved from non-volatile storage.

Management of the buffer space is a major operational bottleneck for data processing systems with multiple users and large numbers of data files. In UNIX, the buffer space is managed in a least recently used manner, such that when the buffer space is full, a page is released from the buffer according to a simple algorithm to make space for the current transaction. However, there is no guarantee that the space being released is not critical data for another program running in the system, because all users share the same buffer pool. Also, when very large migration of data takes place, the buffer pool can be quickly depleted for use by the migration transaction, effectively locking out other users of the system during the migration.

In other operating systems, such as MVS, the buffer space is allocated to a group of buffer pools. Each buffer pool is managed essentially independently by the users or subsystems accessing the buffer space. By dividing up the buffer space among users, better control over availability of pages of data can be exercised, such as required in transaction control systems that perform a journal function for each transaction. However, by statically allocating buffer space among a plurality of users, inefficiencies arise that influence the overall performance of the data processing system. For instance, a given subsystem may be active during a particular time of day and inactive during another time. However, without action on the part of the subsystem, its buffer space will remain allocated throughout the day leaving a large amount of buffer space unavailable for use.

The problem of efficiently allocating buffer space among users in MVS-based systems is a major operational problem that consumes a great deal of resources and renders operation of the data processing system extremely complex to users.

Accordingly, a file system is needed that is capable of exploiting large numbers of access paths, and providing efficient access to files which range in size from a few bytes to hundreds of gigabytes and beyond. The file system must be extended to allow for efficient journaling of transactions and database processing. Also, it is desirable that operation of the file system be convenient and automated and that it be adaptable to emerging storage device technology. Further, it is desirable to provide a file system that will allow continuous access to data concurrently with maintenance, migration and error correction on files being used.

SUMMARY OF THE INVENTION

The present invention provides an apparatus for managing data files for access by a plurality of users of a data processing system that includes internal storage for buffering, external storage, and a file user interface by which the plurality of users request access to data files. The apparatus comprises a first level, coupled to the file user interface and the internal storage for allocating the internal storage for temporary storage of data to be accessed by the plurality of users, and generating requests for transactions with external storage in support of such allocations. A second level is coupled to the first level and the external storage and responds to the request for transactions with the external storage for managing the transactions for storage of data to, and retrieval of data from, the external storage.

The system may include large numbers of storage devices and access paths through which data can be transferred between the internal storage and the storage devices. In such a system, the second level defines a plurality of physical storage classes which are characterized by pre-specified parameters that allocate data files subject of transactions to locations in external memory. In response to requests for transactions, the second level identifies one of the plurality of storage classes assigned to the data file subject of the transaction and carries out the transaction with the appropriate locations in external memory.

At least one of the plurality of storage classes provides for utilization of a plurality of access paths in parallel for transactions involving data files assigned to such storage class. Further, at least one pre-specified parameter for storage classes identifies a level of reliability desired for the subject data files. The second level in response to that parameter, generates error correction codes, or performs duplication for mirroring-type reliability systems, and allocates the mirrored data or generated error correction codes to locations in external memory. For transactions retrieving data from allocated data files, the second level includes means for detecting and correcting errors.

The first level includes a means such as dependency graphs for specifying dependencies for locations in the internal storage allocated among the plurality of users. In response to the dependencies, the first level provides for locating, journaling and releasing locations in a manner transparent to the plurality of users. By specifying dependencies in an appropriate manner, global balancing of the internal storage can be achieved.

By providing for dynamic allocation of storage classes, along with error correction that is transparent to users, the file system will exhibit a high degree of fault tolerance while assuring continuous operation during error correction transactions and transactions that may require re-allocation of data from one storage device to another.

In a preferred system, one of the storage classes will provide for record level striping. Thus, according to another aspect, the present invention provides an efficient method of performing data input-output within a computer system consisting of parametric record-level striping, to achieve high data transfer rates, which in combination with error correction codes and recovery methods, also achieves improved data availability and reliability for very large file systems. According to this aspect, the present invention can be characterized as an apparatus for storing a data file which includes a sequence of local cells $LC_i$ for i equal to one through X. Each local cell in the file includes at least one basic unit of transfer (block) by users of the data file. The apparatus comprises a plurality of storage units for storing data, such as magnetic tapes, magnetic disks, or any other non-volatile storage device. A plurality of input-output (I/O) paths, $P_n$, for n equal to 1 through N, is included. Each path in the plurality is coupled with a subset of the plurality of storage units, so that blocks of data can be transmitted in parallel through the plurality of paths to and from the plurality of storage units. A control unit is coupled to the plurality of paths, for allocating the sequence of local cells $LC_i$, to at least a subset of the plurality of storage units, so that local cell $LC_j$ is stored in a storage unit coupled to path $P_n$, and local cell $LC_{i+1}$ is stored in a storage unit coupled to path $P_k$, where k is not equal to n.

According to one embodiment of the present invention, the path on which local cell $LC_j$ is stored, is equal to $(((j-1) \mod N)+1)$; an N local cell define a cell that can be accessed through the N access paths in parallel. Alternatively, parametric selection of different methods of assignment of local cells across the paths, can be made on the same set of storage units, so that the speed of individual devices, size of cells and local cells for given files and the amount of data manipulation by programs using the files can be matched.

According to another aspect of the present invention, for every $N-1$ local cells in the file, a correction block is generated, consisting of correction codes for the $N-1$ local cells. By providing an additional path across which correction blocks can be allocated within a data file, corrections of previously uncorrectable errors detected during accesses through a given path, can be made. To increase performance for some file systems, the allocation of error correction blocks can be rotated across the N paths for file systems that will require multiple accesses to the correction blocks. Further, the error correction scheme can be expanded to provide for multiple error correction, using additional paths for correction blocks.

A file system according to the present invention is adaptable to a wide variety of operational requirements. For instance, one storage class can be defined that reflects a standard UNIX file system structure. Of course, a storage class can be defined to meet other existing file system structures as well.

Many applications require high speed sequential processing. One storage class could be defined according to the present invention, that reflects device geometry like tracks and cylinders, in order to take advantage of the highest speed transfer rates of individual devices. Further, by providing a number of access paths in parallel, each path providing maximum transfer speed for devices to which the path attaches, extremely high sequential processing speeds can be achieved.

Operational databases, on the other hand, typically require efficient random access to small objects which are contained within blocks as well as high sequential access speeds for batch processing, copying images and database recovery. By using proper storage class definition, the sequential access can be executed as fast as required. The reliability requirements can be satisfied through proper reliability parameters. Finally, a high random update rate may best use a reliability feature such as mirroring, while a low random update may best use parity-based reliability systems.

Non-operational databases such as CAD/CAM databases are often characterized by large objects comprising several megabytes of data. Using a storage class that could contain an average object in a few cells, would be very beneficial to the performance of such a system.

BRIEF DESCRIPTION OF THE DRAWINGS

FIG. 6 is a schematic diagram of a data file according to the present invention.

FIG. 8 illustrates the logical organization of a data file according to the present invention, without error correction.

FIG. 9 illustrates IDAW lists implementing record level striping of the file in FIG. 5.

FIG. 14 is a diagram of the logical organization of a data file incorporating double error correction according to the present invention.

FIG. 15 illustrates IDAW lists implementing record level striping of the file in FIG. 11.

DESCRIPTION OF THE PREFERRED EMBODIMENT

With reference to the figures, a detailed description of the present invention is provided. The organization of the file system is described with reference to FIGS. 2-4. With reference to FIG. 5, a hardware system overview is provided. With reference to FIGS. 6-15, the implementation of the parametric record striping according to the present invention, is described. With reference to FIGS. 16-26, a detailed implementation of one software embodiment of the parametric striping is described. An appendix accompanies the disclosure under 37 CFR §1.96(a)(ii), providing a source code example of key portions of the embodiment described with reference to FIGS. 16-26.

I. File System Structure

Figure 1:
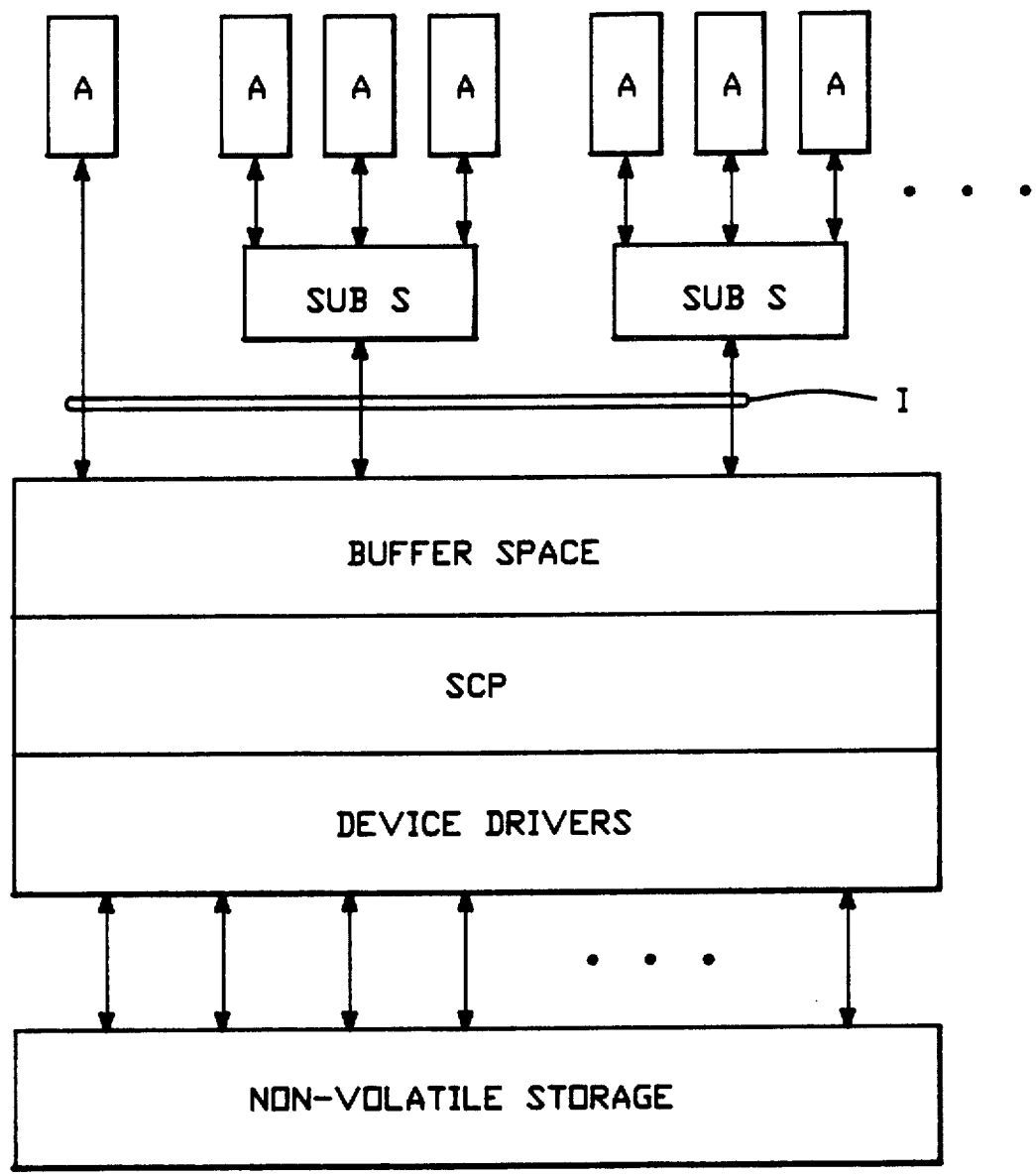
FIG. 1 is a block diagram of a file system according to the prior art.
Figure 2:
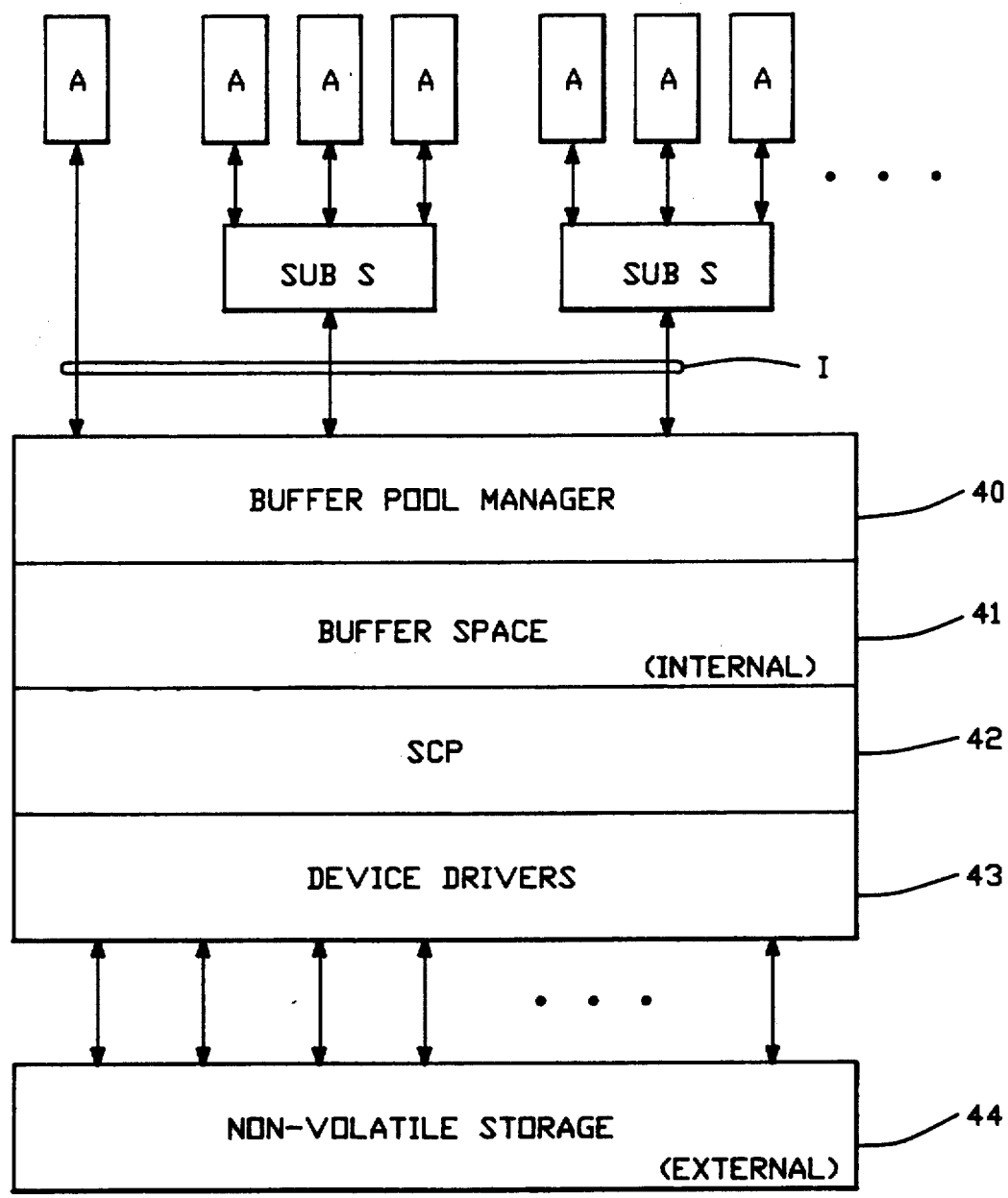
FIG. 2 is a block diagram of a file system encompassing the present invention.

FIG. 2 is a block diagram of a file system according to the present invention. The file system shown in FIG. 2 provides a buffer pool manager 40 between the user interface I and the buffer space which comprises the internal storage 41 of the computer system. The buffer pool manager 40 allocates the internal storage 41 for temporary storage of data to be accessed by the plurality of users of the system and generates requests for transactions to the external storage 44 in support of the allocating of the buffer pool. The storage control program 42 in combination with device drivers 43 responds to the requests for transactions generated by the buffer pool manager 40 and manages the transaction with external storage 44 for storage of data to, and retrieval of data from, the external storage. Management of the buffer space 40 in response to particular file parameters has been taken off the shoulders of the program's users and placed below the file user interface I. Further, the generation of requests for transactions with external storage has been placed below the buffer pool manager 40, further insulating that operation from users.

Figure 3:
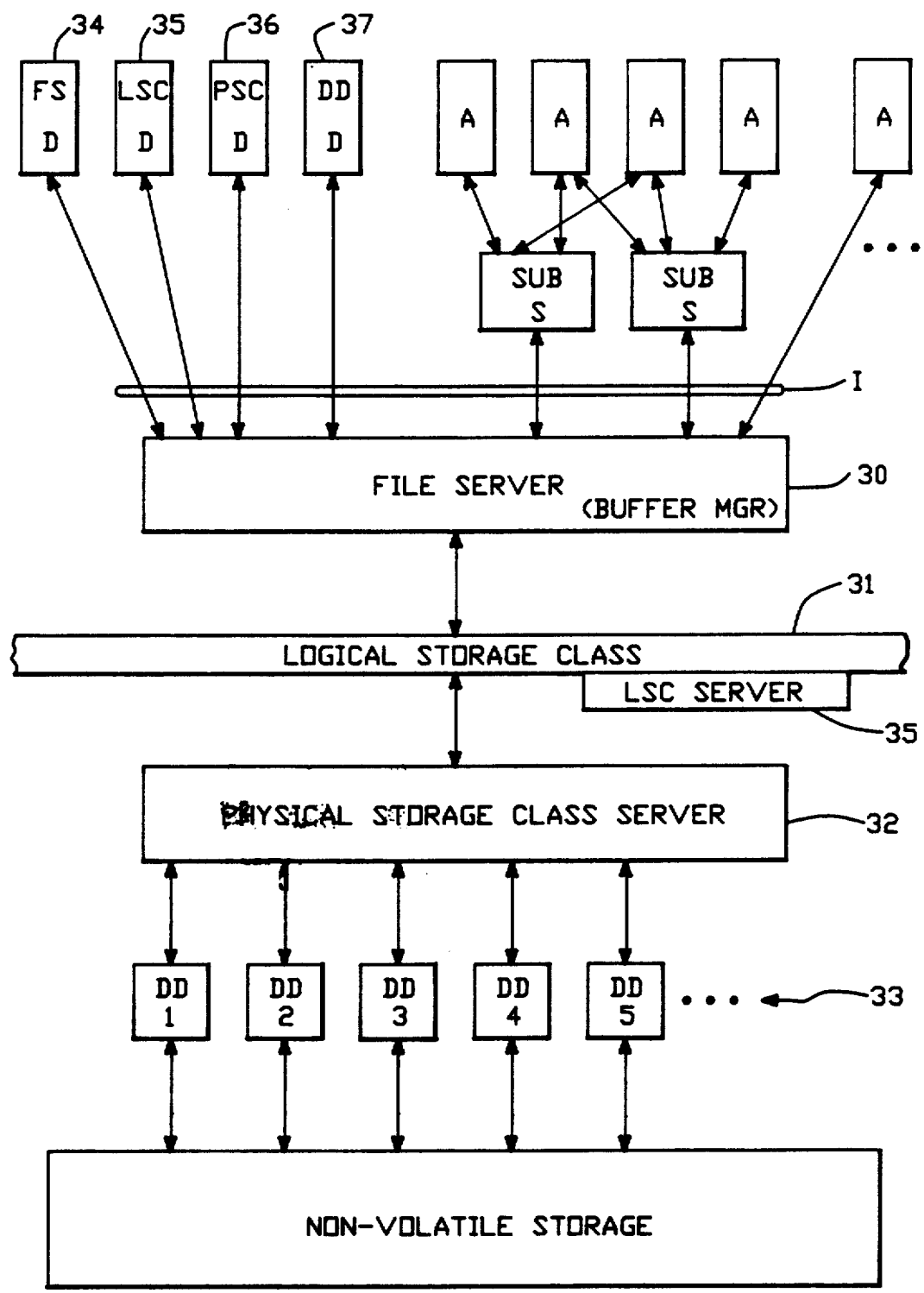
FIG. 3 is a block diagram illustrating data flow through levels of a file system according to the present invention.

FIG. 3 is a more detailed block diagram of a preferred embodiment of the file system according to the present invention. The buffer space is not shown in FIG. 3 to simplify the figure.

The file system shown in FIG. 3 includes a file server 30 which is coupled to the file user interface I. The file user interface I in the preferred embodiment is the UNIX V R3 interface as run by the Amdahl UTS operating system, but can be any other interface specified by the user. Therefore, any program written against the file user interface I, in the preferred embodiment, will work with the file system, while allocation of buffer space and control of transactions with external storage are transparent to the user.

Below the file user interface I, the file system includes a file server 30 which provides buffer management. Below the file server 30 is a logical storage class 31 which presents an immense linear address space to the file server 30. A logical storage class server 35 controls allocation of the logical storage class 31. Below the logical storage class 31 is a physical storage class server 32 which performs the actual management of transactions with external storage. Coupled to the physical storage class server 32 is a plurality of device drivers 33 which creates channel programs, performs error recovery algorithms and provides other services such as filtering.

Associated with each server 30, 35, 32, 33 in the file system is a demon program, providing a user interface for control of functionality of the respective servers. Accordingly, there is a file server demon 34, a logical storage class demon 35, a physical storage class demon 36 and a device driver demon 37. The demons 34, 35, 36, 37 communicate through the file user interface I with the file system in one embodiment. Alternatively, they can be adapted to meet the needs of a particular system if desired.

Figure 4:
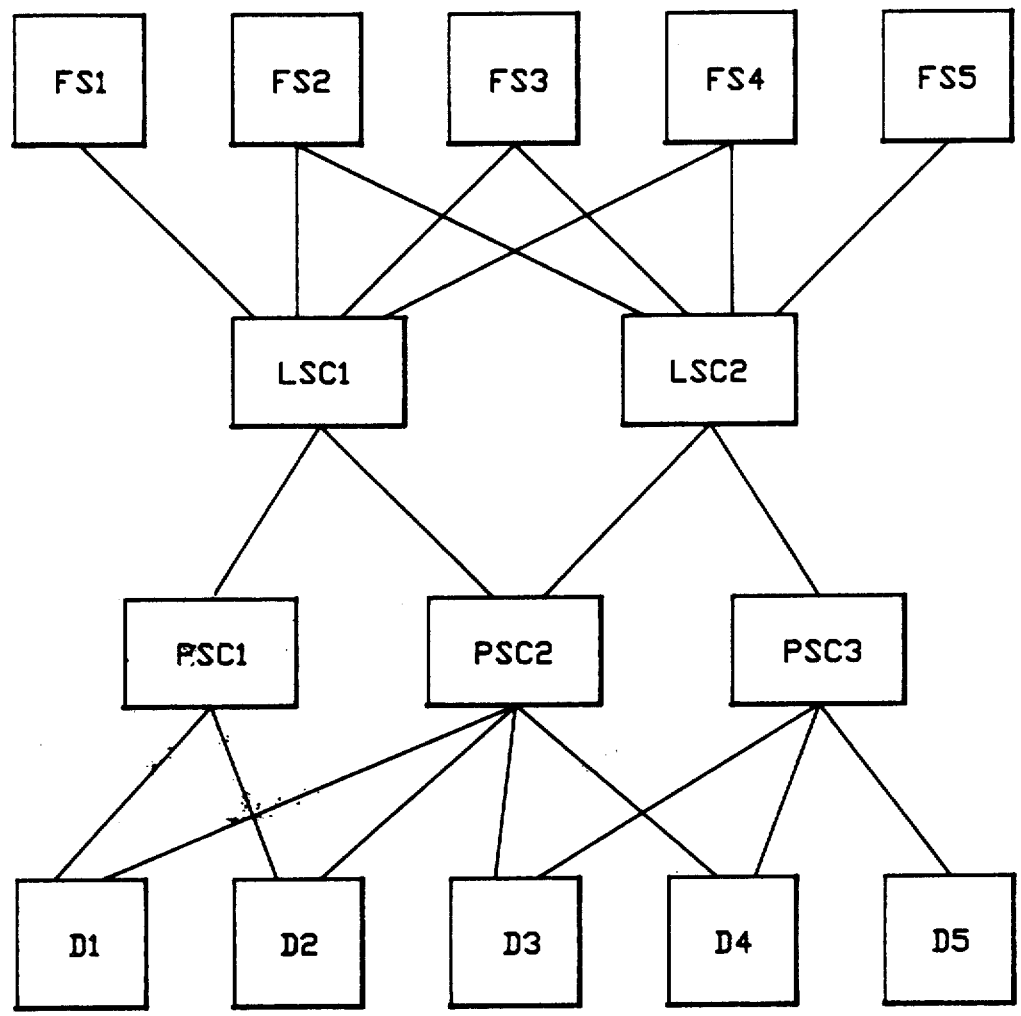
FIG. 4 is a diagram illustrating a structure of the levels of the file system according to the present invention.
Figure 5:
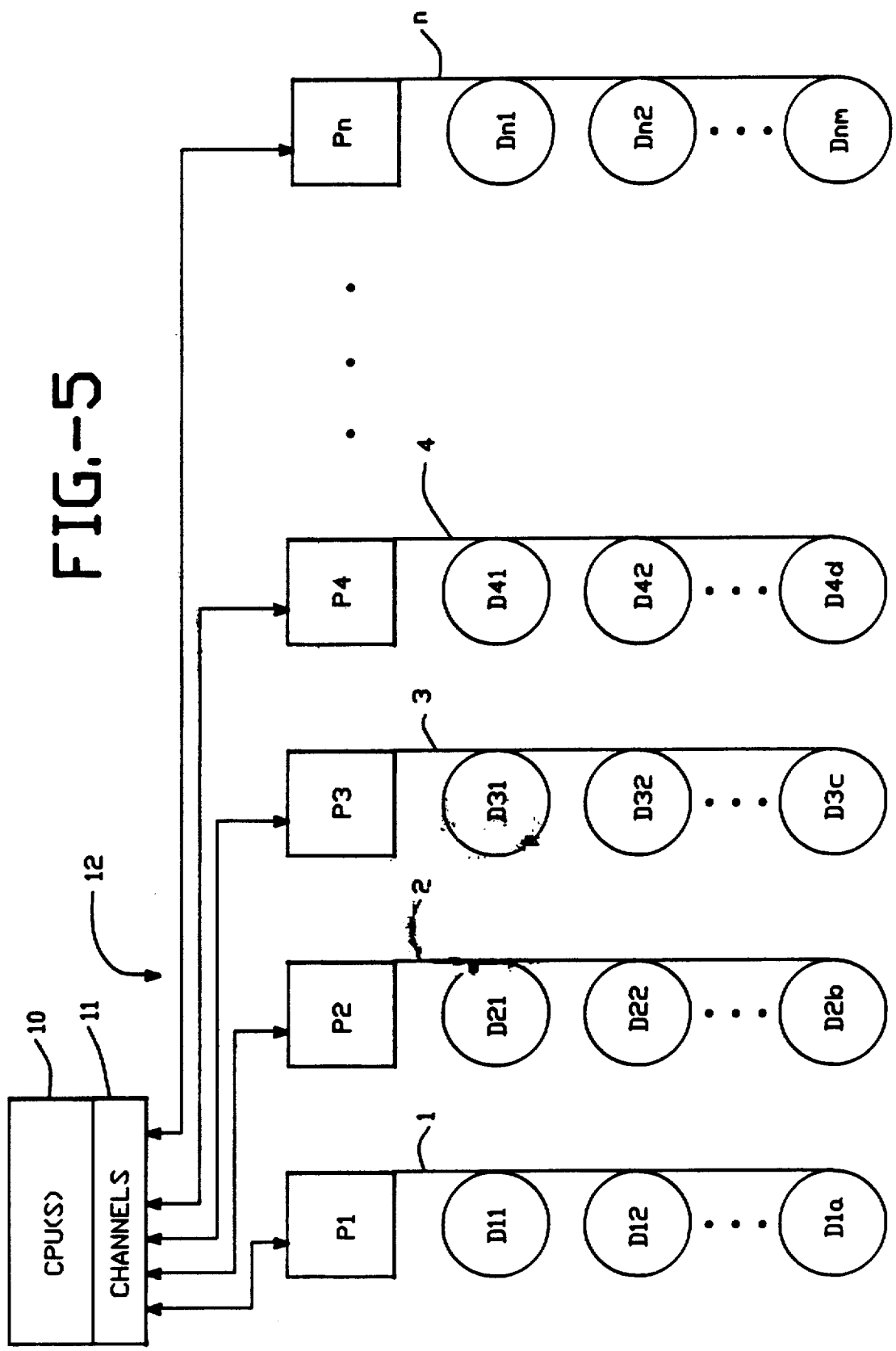
FIG. 5 is a block diagram of a computer system with a data storage subsystem having a plurality of input-output paths and a large number of physical storage devices.

FIG. 4, illustrates the structure of the preferred system with isolation and layering. FIG. 4 is a schematic diagram of the file system with multiple independent file servers FS1, FS2, FS3, FS4 and FS5. Each of these file servers will be coupled to a plurality of users. Many of them may in fact serve a pool of users which is identical or pools of users which overlap in order to provide multiple paths from the users to the file system in support of continuous operation of the data processing system. Also shown in FIG. 4 are redundant logical storage classes LSC1 and LSC2. LSC1 is coupled to file servers FS1-FS4, while LSC2 is coupled to file servers FS2-FS5. This provides the multiple paths through the file system needed for continuous operation.

Likewise, there is a plurality of physical storage class servers PSC1-PSC3 and a plurality of device drivers D1-D5 which are cross-coupled among the physical storage class drivers As can be seen, a user coupled to file server 3 and file server 4 can be assured of continuous operation of the file system given any single point of failure. Each server in one level can be used by multiple servers of the next higher level. Additionally, each server can involve the services of several servers of the next lower level. This allows replication of functions on each level.

The servers on each level are responsible for execution of normal operations for the level and recognition of exceptions occurring. Any exception will be handled by an associated demon. This demon will execute as a transaction process which will be created whenever there is an exception. Fault tolerance and continuous operations require the existence of permanent data related to servers. These data can be maintained by the associated demon, and accessed by the server for use. Although the preferred system consists of four levels, a more complex structure is certainly possible.

At the file server level, support for a different file structure as used by users of the system, could be provided. In a system with only the UNIX V R3 file interface, the files are treated as linear byte-oriented address space as seen by the users. Other well-known structures such as index structures could be supported.

At the logical storage class level, a linear address space is presented to the file servers. The file servers can obtain, modify and release the linear address space. For the linear address, space can be foreseen on the order of exabytes.

In the physical storage class level, logical devices are presented to the logical storage class. The logical devices are created from real devices based on parametric mapping of the logical storage class to a physical storage class. Characteristics of the physical storage class are described in more detail below.

At the device server level, storage devices are presented to the physical storage class. These devices closely match physical devices; however, they present a view of linear address space, allow a multiple of concurrent requests, and can be adapted to handle advanced functions such as data filters.

The functions of individual levels and their relationship to each other are described below. Each server and its associated demon are coupled. The server executes normal operations and runs as a permanent process in the file system. The permanent process uses temporary data derived from permanent data that is maintained by the demon. The demon processes exceptions reported by its associated server. The demon also can associate a process structure with user and system applications and transactions, while running as a temporary process.

The file server functions include the following:
(1) Determine the location of data within the file;
(2) Synchronize updates to permanent storage with associated journaling using dependency graphs;
(3) Allow multiple concurrent requests.

The file server demon functions include the following:

(1) Keep and update permanent information on the status of programs and information about files;
(2) Communicate with the logical storage class demon.

The logical storage class server functions as follows:
(1) Allocates space for multiple files;
(2) Informs demon about exceptions;
(3) Executes utility functions according to the directives of demons;
(4) Allows multiple concurrent requests The logical storage class server demon provides the following functions;
(1) Maintains information about the mapping of files to the linear storage space of the logical storage class;
(2) Communicates to the file server and the physical storage class demon;
(3) Supervises replication and relocation of data.

The physical storage class server provides the following functions:
(1) Assigns storage class to files;
(2) Accomplishes striping as discussed below, including creating multiple paths, adding error correction to files, and rotating files;
(3) Does device replication functions;
(4) Chooses the best devices for reads of data;
(5) Chooses strategy for updates to files;
(6) Creates requests to the device server for transactions with external storage;
(7) Informs the associated demon about exceptions;
(8) Allows multiple requests in parallel;
(9) Rebuilds data from error correction information.

The physical storage class demon provides the following functions;
(1) Maintains information on mapping strategy, error conditions and repairs in progress to data files;
(2) Communicates with the logical storage class and device driver demon;
(3) Replicates and relocates data.

The device server functions include the following:
(1) Builds channel programs;
(2) Supervises device interrupts;
(3) Reports exceptions to the demon;
(4) Allows multiple requests in parallel;
(5) Allows prioritized requests;
(6) Allows requests to be preemptive;
(7) Allows extended functions such as filters.

The device server demon provides the following information:
(1) Maintains information on device geometry, device connections or topology, device and connection speed, device and connection usage, error histories, organization of devices into pools;
(2) Communicates with the physical storage class demon;
(3) Does device replication.

II. File Structure Overview

The file structure according to the present invention can be with reference to five layers:

User —this is the application program file specification.

File —this is the linear address space as seen by the user.

Logical storage class —this is the named linear address space into which files are mapped by the file server. At this level only the size of the space allocated by the file server is of interest to the file structure.

Physical storage class —this is the mapping for performance and reliability of a logical storage class into a set of physical devices. This can be thought of as logical storage media constructed from physical media showing characteristics defined by storage class parameters as described below.

Physical storage —a representation of the physical media as linear address space through the device drivers. The physical media may be any storage considered external to the computer system and is typically nonvolatile. For this specification, a layer that is earlier on the list in the file structure, is a higher level layer.

According to this file system, the following conditions are true:

(1) Each layer is logically independent from the other layer.

(2) The internal structures of the layers are independent from each other.

(3) The layers may communicate between each other via either message protocols, or shared storage. Different layers can be adapted to different manners of communication.

(4) Utilities dealing with movement or relocation of data are not executed in the user mode, but are integrated into the layers of the file structure.

(5) Structural information about the individual layers of the file structure is kept in databases and can be modified by transactions internal to the file structure.

(6) The user can issue multiple requests for transactions at a time.

(7) Multiple processes can be used to handle requests.

The file system works with current user interfaces and optimizes access strategies according to observed access characteristics or through operational hints provided through the associated demons or otherwise. Additionally, the file system can provide enhanced interfaces that allow applications to give information about current and planned access patterns to the file system.

III. Access and Buffering

The access of data is controlled by LOCATE, RELEASE and JOURNAL requests for use of the internal buffer space at the file server level. The LOCATE function can be a read, update or write type request. The read request locates existing data areas while allowing concurrent buffer writes of the data areas to external storage due to changes to the data from other requesters. The update request locates an existing data area while preventing concurrent buffer writes to external storage. The write function writes data without previous access to eventually existing data, and prevents concurrent buffer writes to external storage. The following parameters are available for the LOCATE function:

(1) SEQ —current access is sequential. Data should be retrieved ahead of the request and data that have been used should be discarded.

(2) RAND —the current access is random. Only the requested data should be retrieved.

(3) STRx —the size of data which should be retrieved on the average with one access. x is the number of bytes, STR is the abbreviation for string. Note that this parameter should be used when a file is opened since it indicates a preferred buffer size.

(4) TOKEN —a token is returned by a locate request and identifies the data area or the buffer being utilized. This parameter is optional, because the process identification can always be allocated as an implicit token.

Application requests for special buffering will be subject to the restrictions that a string has to be smaller than a cell as defined by the striping driver; if multiple string lengths are defined, for any pair, one string should be a multiple of the other; and, a single request cannot include both an SEQ and a RAND parameter.

Integrity between data in different buffer pools is maintained by the file system, and conflicts between string sizes are solved by the system giving preference to some specification, or using a number that represents a compromise. The exact nature of the integrity algorithm can be worked out to meet the needs of a particular application.

A buffer that has been blocked against externalization has to be freed by a RELEASE request. The RELEASE request is represented by a TOKEN that can be obtained by a locate request This parameter defines which data areas do not need to be protected against externalization after the release request.

If a process terminates, all data areas associated with that process will be implicitly released by using the process identification as a token.

A modification can be journaled by the JOURNAL request. The process can specify the following parameters:

(1) TYPE —type specifies the journal record type. Specific types of journals can be selected for particular applications.

(2) TOKEN —one or more tokens obtained by locate requests may be specified for the journal request. This parameter defines which data areas cannot be externalized until the current journal record has been written.

(3) DATA —this is the location of the data that has been placed into the journal.

(4) RELEASE —one or more tokens obtained by the locate request may be specified. This parameter defines which data areas do not need to be protected against externalization after the journal is completed.

Buffer manipulation is controlled by the following rules:

(1) A buffer request will not be externalized between any LOCATE with update or write, and a RELEASE function.

(2) If a JOURNAL request is related to a buffer, the buffer will not be externalized until the journal information has been externalized.

(3) The LOCATE, RELEASE and JOURNAL functions are also available to the file system user layer.

(4) The file system does not maintain data integrity between processes through a locking protocol. This must be done by the processes outside of the file system.

IV. Storage Class Description

In the file system, files are located in storage classes by the physical storage class server. Each storage class is identified by:

NAME Any valid name in UNIX.

SIZE Any number between 1 byte and 16 EB (exabytes), the number will be rounded to the next higher multiple of depth and width. The size determines only the size of the data area that contains user data. The actual space requirement on storage media may be increased due to reliability requirements.

DEPTH A number between 1 and D representing the number of bytes stored contiguously on one path. Such a contiguous storage area will be called a Local Cell. D is a multiple of the basic unit of transfer called a Block which is normally 4k. The maximum possible D is determined by the file system implementation and the available hardware WIDTH A number between 1 and W representing the number of parallel access paths to a storage class. The maximum possible W is determined by the file system implementation and the available hardware Each access path has the same number of local cells. The storage that is represented by the local cell in the same relative position in each access path is called a Cell.

RELIABILITY —The following specifications are possible:

None: Media reliability is sufficient. None is the default.

SPAR: Single parity should be used.

PARx: x parity paths should be added: x is a number between 1 and N. The maximum possible N is determined by the file system implementation and the available hardware. PAR1 is identical to SPAR.

DUAL: The data of each path are written on two independent disks.

REx: The data should be written (replicated) to x independent disks. x is a number between 1 and N. The maximum possible N is determined by the file system implementation and the available hardware. RE1 is identical to DUAL.

Error correction codes other than parity-based codes, can be used, such as by use of add logical functions that subtract from zero to generate the code, then add back to detect errors The parameters size, depth, and width have to be specified exactly once; the reliability parameter may be omitted or there may be at most one parameter of each of the pairs SPAR, PARx, AND DUAL, REx. If Reliability other than None has been specified, we say that the storage class has Enhanced Reliability.

The reliability parameter allows the user to specify as much protection against media error as desired. For a desired mean time between failure MTBF, there is a definition that will exceed this MTBF. The system will help the user choose the proper balance between desired MTBF and storage and access costs, which is highly dependent on the access pattern, especially the read-to-update ratio for updates covering less than a cell.

Increased reliability is achieved through the addition of data using either simple parity information or Hamming code. Increased reliability requires additional space on media. The system will increase the width and add the necessary amount of local cells to hold the parity information. The increase of the width will be done automatically. The user can ignore the additional space requirements; however, operations must be aware of it.

Files will be mapped into storage classes. Two files will never share a cell.

V. Availability

Availability has two major components, continuous operations and fault tolerance. The file system is able to handle both aspects according to the state of the art.

A. Continuous Operations Continuous operation is the ability to change the elements and the usage of the file system, including association of files to storage classes, the storage class definition, and the underlying storage media:

regardless of whether data are currently used,
without any loss of data integrity, and
with the guarantee that the change is permanent.
This is achieved by:
building the logic for continuous operations into each level,
having a data buffer on each level,
adhering to the flow of control requirements between levels,
keeping structure and status information in databases,
maintaining isolation and independence of multiple servers of each level.

B. Fault Tolerance

The file system is able to handle all the possible media errors, as long as they are within the limitation of the defined reliability.

1. Soft Errors

Soft errors in the storage are recognized by the file system. The users can, while using the system, allocate new DASD storage to the part(s) of the storage class that show errors. The file system relocates the data even while they are used. Relocation is optimized regardless of the depth number.

2. Hard Errors (tracks)

If a track becomes unusable and enhanced reliability has been specified, the system re-allocates the track and reconstruct the data as soon as the error has been discovered. This process is transparent to the user of the file system and to operations and does not lead to any noticeable degradation of the system.

3. Hard Errors (media)

If a DASD device becomes unusable and enhanced reliability has been specified, the system asks for a new device or choose a new device if one or more have been pre-allocated for emergency use and move the data to the new device. This is done as soon as the error has been discovered. This process is transparent to the user of the file system. Operations may be involved. Some degradation of the system for certain storage areas may be experienced, since the physical mapping may not be as optimal as it was under "normal" operation. In such a case, the data is remapped as soon as the failing device has been repaired. This process is automated and therefore transparent to operations.

Prior art file systems are designed to use one access path for any request to a file. This is absolutely reasonable as long as there are very few elements (DASDs) to store the data. However, a system with many storage devices and many independent access paths allows the exploitation of parallelism to enhance dramatically the response time for a given task and as a by-product to enhance potentially the throughput of a system.

VI. Migration

It is possible to move a file from one storage class to another storage class just by using the copy command in the file system according to the present invention. The file system includes a utility coupled to the device drivers and physical storage class driver to carry out migration without substantial interruptions to users accessing the data A local cell can be transferred between devices or a cell can be transferred to a new storage class. The system control program locks the subject local cell or cell during the transfer, using any of several well known locking techniques. If an access to the locked cell or local cell is requested, the user will experience only a short delay until the transfer completes. The copy command can apply to storage classes as well. To transfer a file into the file system, the file must be closed and copied to a storage class. From that point, the file can be used with all the facilities offered by the described file system.

VII. Simplified Hardware Overview

FIG. 5 is a simplified block diagram of a computer system with a large number of data storage devices which could implement the present invention. The computer system includes a basic computer which includes one or more central processing units 10. The central processing units 10 communicate through channel interfaces 11 to a plurality of channels 12. The channels are coupled to control units P1-Pn which define input/output paths from the CPUs 10 to data storage devices D11-Dnm. Coupled to path P1 is a string of data storage devices D11, D12 . . . D1a, where a is an integer. Data can be written or read from any of the devices coupled to path P1 across line 1. Line 1 may include a plurality of actual paths for accessing the data stored in the devices D11-D1a as known in the art. Likewise, the plurality of devices D21-D2b is coupled across line 2 to path P2; a plurality of devices D31-D3c is coupled across line 3 to path P3; a plurality of devices D41-D4d is coupled across line 4 to path P4; . . . and a plurality of devices Dn1-Dnm is coupled across line n to path Pn to support input-output under control of the CPUs 10.

The data to storage devices, D11-Dnm, illustrated in FIG. 5 may include any type of physical device, such as tape drives, high end hard disk drives such as the IBM 3380 class disk drives, smaller disk drives (SCSI), optical media or any other type of storage device. There may be only one device in a given path; there may be varying numbers of devices on different paths; and there may be very large numbers of devices on given paths. The file storage system according to the present invention, is able to allocate storage logically across a number of paths having a wide variety of different characteristics as is more fully described below.

Although not illustrated in FIG. 5, the preferred data processing system includes a large number of redundant paths to any given location in the physical media. Accordingly, control unit P1 also provides a path to the string of devices coupled to path 2, and control unit P2 will provide an access path for the string of devices coupled to path 1. Likewise, each control unit may provide two or more paths to each device to which it is coupled. In this manner, a failure in the hardware can be recovered through an alternate functioning path, and a system can provide for continuous operation by dynamically reconfiguring the access path in response to the failure. A failure occurring in the external storage system will be reported to a device driver which will perform the error recovery techniques or recalculate an access path to the affected local cell of data. The level of redundancy in the access paths can be adapted to meet a given mean time to failure requirement for the data processing system, or for individual files stored in the external storage system.

VIII. Logical Organization of Data Files

FIGS. 6-11, illustrate the logical organization of the data files which have been "striped" according to the present invention. In FIG. 6, a data file is illustrated schematically as an array of local cells LC1-LC20. The array includes columns which correspond to logical paths P1-P5 in FIG. 6 and rows which correspond to cells. As can be seen, sequential local cells are allocated to different logical paths in the system. For highest performance, a logical path will equal a physical path. However, two logical paths can share a physical path, or a single logical path can involve two physical paths.

Figure 7:
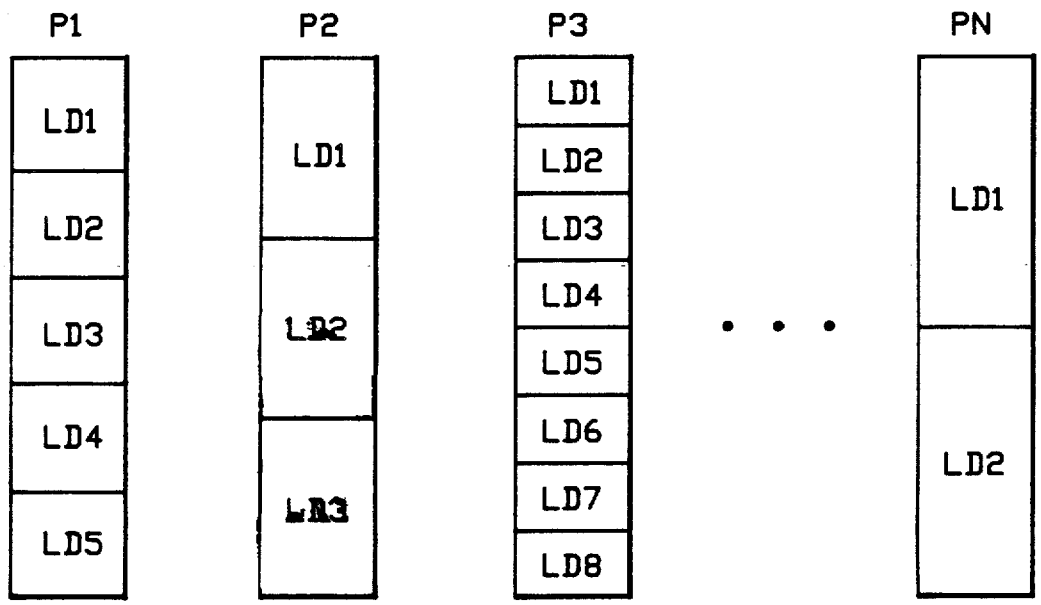
FIG. 7 is a diagram illustrating the logical disk and available path concepts

FIG. 7 illustrates the available path and logical device concept. For an available physical path P1-Pn, storage may be allocated along logical rather than physical boundaries if desired. Thus, physical path P1 may include five actual devices which are treated as five logical disks. Physical path P2 may include a single high capacity disk that would be treated by the file system as three logical disks. Physical path P3 may include a number of high capacity devices that are configured as eight logical disks. Likewise, the physical path PN may be configured as two logical disks. As the file system allocates a data file to the storage system, it can identify available paths within the system, i.e., paths that have logical disks available for use, and allocate the data file across those available paths to make optimal usage of the storage devices. The process of identifying available paths may be a dynamic one, happening as the files are allocated, or a prespecified one set up in advance by programmers who configure the storage system.

As illustrated in FIG. 6, the preferred embodiment of the striping algorithm according to the present invention, allocates local cell $LC_i$ to path $P(((i-1)\mod N)+1)$, where N is the number of available logical paths; and i goes from one to X, where X is the number of local cells in the file. In this manner, sequential local cells are allocated to sequential paths, and no two sequential local cells are located on the same path. Also, a cell of N local cells may be transferred in a single parallel I/O transaction, if a logical path equals a physical path.

IX. Examples of Striped Data Files

FIGS. 8-15 illustrate examples of striped data files using various types of error correction according to the present invention. FIG. 8 is a data file including blocks B0-B199, where each block B is an addressable unit for channel operation. The blocks are sectioned into local cells of ten blocks each B0-B9, B10-B19, . . . , B190-B199. The data file will be striped so that there are five paths utilized for this data file, four cells deep S0-S3. The file system will generate an IDAW list (where a logical path equals a physical path) as illustrated in FIG. 9 where path 0 includes the local cells B0-B9, B50-B59, B100-B109, and B150-B159. Path 1 will have local cells B10-B19, B60-B69, B110-B119, and B160-B169. Path P4 will include local cells B40-B49, B90-B99, B140-B149 and B190-B199. As mentioned above, with reference to the logical disks and available path concept, the path P0-P4 illustrated in FIG. 8 could be any available paths to the identified local cells in a data storage system that may include a large number of physical paths As can be seen, in FIGS. 8 and 9 there is no additional error correction capability provided. The control unit for each physical path will have its own error correction capability using parity or error correction codes incorporated in the data as is well known in the art. In the event that an uncorrectable error occurs in any path, that data will be lost, the loss reported to the device driver, and the file system will be required to take recovery steps.

In systems where high reliability is required, an error correction capability can be provided according to the present invention as illustrated in FIGS. 10–18. The level of error correction capability can be selected to meet the need of a particular data file. For instance, single error correction can be provided in a variety of formats such as shown in FIGS. 10–13, double error correction can be provided as shown in FIGS. 14 and 15. Finally, mirrored, or multiple redundant striped data files could be provided if higher reliability is needed. The level of error correction desired can be specified in the preferred system as a parameter for the storage class.

Figures 10, 11:
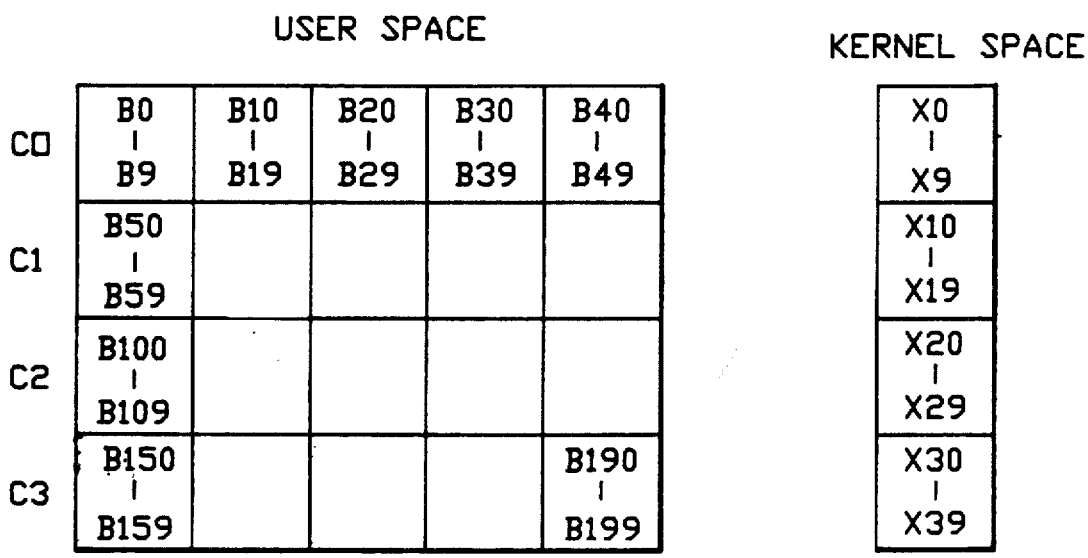
FIG. 10 illustrates the logical organization of a data file according to the present invention, with single error correction.
FIG. 11 illustrates IDAW lists implementing record level striping of the file in FIG. 7.

FIGS. 10 and 11 illustrate the logical organization and the IDAW list generated for a file system using single error correction. As can be seen, the data file is organized as discussed with reference to FIG. 8 except that in the kernel space, error correction blocks X0–X9, X10–X19, X20–X29, and X30–X39 in respective local cells are generated by the file system. The file system then generates the IDAW list as illustrated in FIG. 8 assigning all of the error correction blocks to path P5 as illustrated. The error correction blocks in the preferred system are bitwise XOR across corresponding blocks in each cell. Thus X0 is the bitwise XOR of B0, B10, B20, B30, B40. Therefore, if block B10 is lost, it can be replaced by calculating the XOR of B0, B20, B30, B40 and X0.

For file systems in which updates to individual blocks are expected to be frequent, a system in which the correction blocks are stored in a single path may have excessive traffic on the path assigned to the correction blocks. Therefore, an algorithm for distributing the correction blocks among the paths available is desired to prevent contention for one path.

Figures 12, 13:
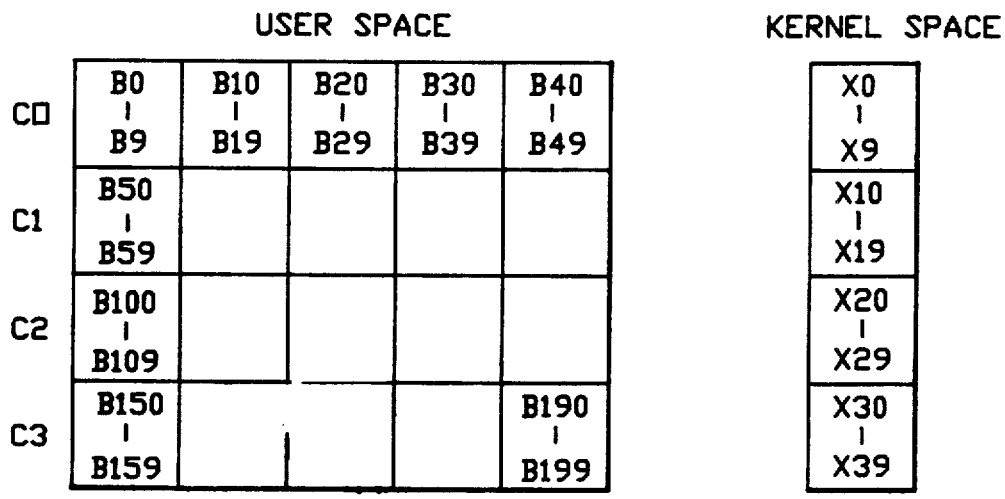
FIG. 12 is a diagram of the logical organization of a data file with single error correction, rotating the path on which the error correction block is stored.
FIG. 13 illustrates IDAW lists implementing record level striping of the file in FIG. 9.

FIGS. 12 and 13 illustrate a single error correction capability with rotating paths for the correction blocks. As can be seen in FIG. 12, the file system generates the correction blocks in the same manner as for single error correction illustrated in FIG. 10. The IDAW lists are generated such that path P0 includes error correction blocks X0–X9 in cell C0, data blocks B50–B59 in cell C1, data record B100–B109 in cell C2 and data blocks B150–B159 in cell C3. In cell C1, the error correction blocks are allocated to path P1. In cell C2, the error correction block is allocated to path P2, and in cell C3, the error correction block is allocated to path P3. In this manner, accesses to the error correction blocks will be spread across the available paths in the system to prevent overuse of a single path for error correction purposes.

Even greater reliability can be provided according to the present invention using double error correction. According to this scheme, two simultaneous errors in separate paths can be corrected. As illustrated in FIGS. 14, the data file includes blocks B0–B9 through B150–B159 arranged in cells S0 through S3. The file system generates a three-bit Hamming code for the local cells of the data file, such that correction blocks X0–X9, X10–X19, through X110–X119 are created. The file system then generates the IDAW list as illustrated in FIG. 15 such that path P0 receives correction blocks X0–X9, X10–X19, X20–X29, X30–X39. Path P1 receives the correction blocks X40–X49, X50–X59, X60–X69, and X70–X79. Path P2 receives data blocks B0–B9, B40–B49, B80–B89 and B120–B129. Path P3 receives correction blocks X80–X89, X90–X99, X100–X109, and X110–X119. Paths P4–P6 receive the balance of the data blocks as illustrated in the figure.

FIG. 15 illustrates a layout of the data files with double ECC that facilitates generation of the correction blocks. These correction blocks could also be distributed among the paths in order to prevent concentration of access to particular paths in the data file.

Although not illustrated in the figures, even more reliability could be provided by a greater level of error correction (i.e., larger error correction codes), or by redundant file storage. The redundant files could be striped as well so that a first copy of a given file would be stored on a first set of available paths in the system, while a second copy of the data file will be stored in a mirrored fashion on a second set of available paths. The file system would automatically generate the mirrored data I/O requests to the physical system in the same manner that it generates the error correction codes as discussed above.

For FIGS. 8–15, the size of local cells is shown as having ten blocks. Obviously other data files can be configured so that the extent of data in each local cell is adapted to match a variety of parameters of the system. For instance, for a data storage system that includes disk drives, a parameter indicating the optimum size of I/O transfer for those disk drives, might be used to determine the local cell size. For instance, if a given disk drive is able to transfer information at the highest rate in sizes equal to the track size of a given disk, the local cell size for the striped data file may be set equal to a track. If a number of tracks in a given disk system make up a cylinder of data and I/O transfers take place on a cylinder level at a higher rate, the local cell size could be made equal to the size of a cylinder within the disk. In addition, other parameters may affect the size in which a local cell is allocated according to the present invention. For instance, an application program may manipulate very large units of data, such as digital images used in sophisticated medical imaging technology. Thus a local cell may be allocated having a size equal to the amount of data required for each of these physical images independent of the physical disk characteristics.

In addition to local cell size, the width, that is the number of paths used, for a given cell of a data file may be a parameter that can be manipulated according to the needs of a particular system. As the number of available paths changes over time with a given computer system, such as when paths are physically added to the system or when data is transferred out of the system, freeing up existing paths, to increase or decrease the number of paths used.

X. A Striping Driver Implementation

FIGS. 16–26 are flowcharts illustrating an implementation of a demonstration version of a file system in the UNIX-based operating system UTS. This demonstration version was prepared for a system on which all storage devices are IBM-class 3380 disk drives, and all I/O operations access entire cells including sequences of local cells. These assumptions were made in order to simplify implementation of this demonstration version.

In a preferred system, these assumptions will be removed.

Figure 16:
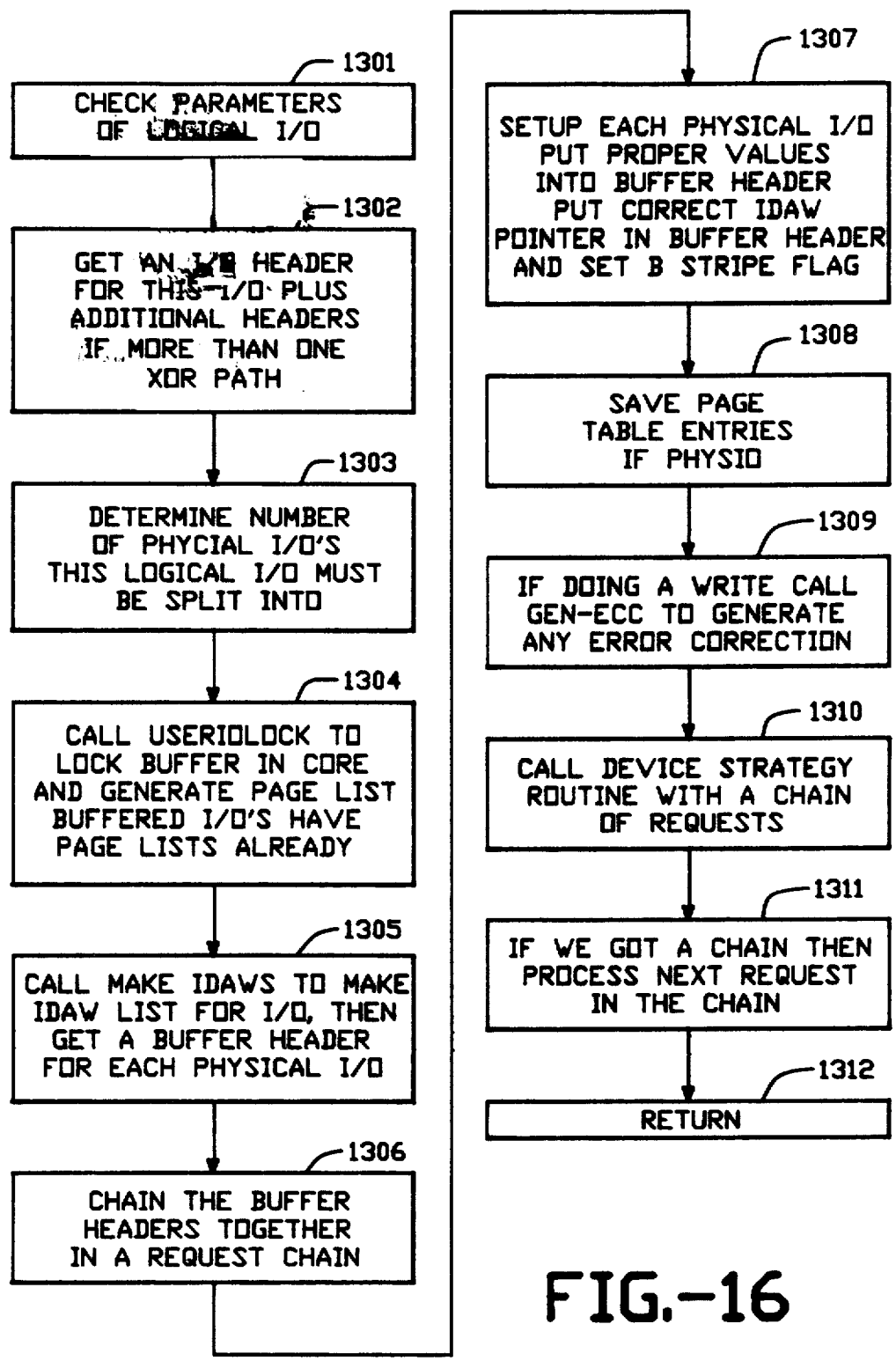
FIG. 16 is a flowchart of a strategy routine for the striping driver according to the present invention.

FIG. 16 illustrates a striping strategy routine called in block 1301 by a request for a transaction with external storage The request will include a buffer header generated by physical I/O requests or by the buffer manager, identifying the file, its logical position and an number of bytes for the transaction. The strategy routine checks the parameters of the I/O operation received from the file system. In response to those parameters, an I/O header for this operation plus additional headers required, if error correction blocks are to be added, are retrieved (block 1302). Next, the number of physical I/O operations into which the subject logical I/O must be split is calculated (block 1303). A routine called useriolock locks a buffer in core for the physical I/O's and generates a page list for real pages in memory. Buffered I/O's have page lists already (block 1304). The routine make_idaws is called to generate an IDAW list for the operation, and a buffer header is then acquired from an allocated pool of buffer headers for each physical I/O (block 1305). The buffer headers are chained together to generate a request chain (block 1306). Each physical I/O is set up and proper values of buffer header variables are set including the correct IDAW pointer and a BSTRIPE flag (used by disk driver to identify striped I/O) (block 1307). Page table entries are saved if the transaction is unbuffered I/O in order to map the user's buffer into the kernel address space (block 1308). If a write is being carried out, the gen_ecc routine is called to generate any error correction required by the user (block 1309). Device strategy routine is called with the chain of physical I/O requests (block 1310). If the input to str-strat() is a chain, then the routine processes next request in that chain (block 1311). Otherwise the routine is finished (block 1312).

Figure 17:
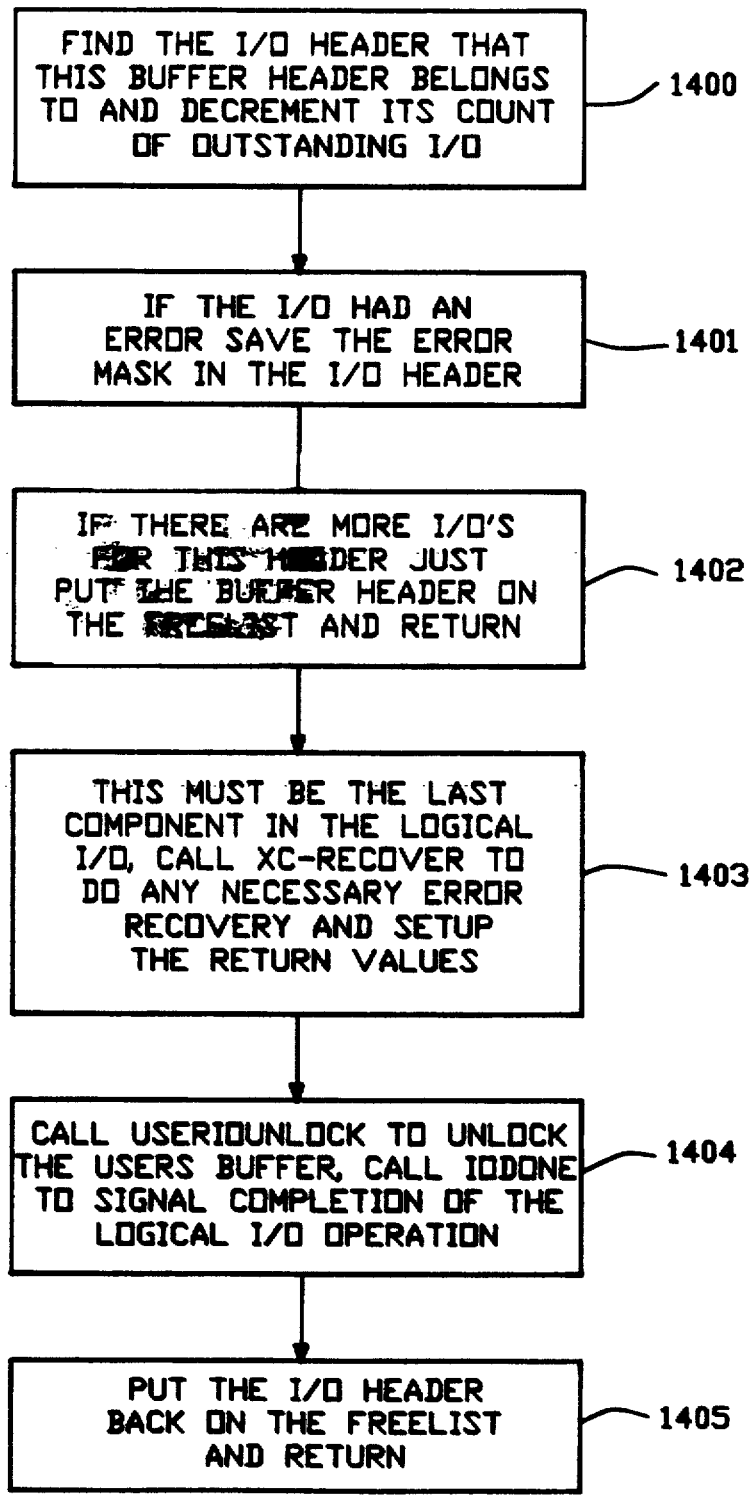
FIG. 17 is a routine called in the striping driver on completion of input/output operations.

FIG. 17 is the str _iodone routine which is called by a modified UTS iodone routine if BSTRIPE is set, to signal the completion of the I/O for a striped buffer header. The UTS iodone routine is called from a disk interrupt routine to signal completion of an I/O transaction. After completion of an I/O, the str_iodone routine begins in block 1400 by finding the I/O header that this buffer header belongs to, and decrementing its count of outstanding I/O's. Next, if the I/O has an error, the error mask is saved in the I/O header (block 1401). If there are more I/O's for this header, the buffer header is put on the free list and the routine returns (block 1402). If there are no more I/O's, this must be the last component of a logical I/O. Thus, the xc_recover routine is called to do any necessary error recovery and to set up return values (block 1403). Next, the userionunlock routine is called to unlock the user buffer and to call iodone to signal completion of the logical I/O operation (block 1404). Finally, the I/O header is put back on the free list and the routine returns (block 1405).

Figure 18:
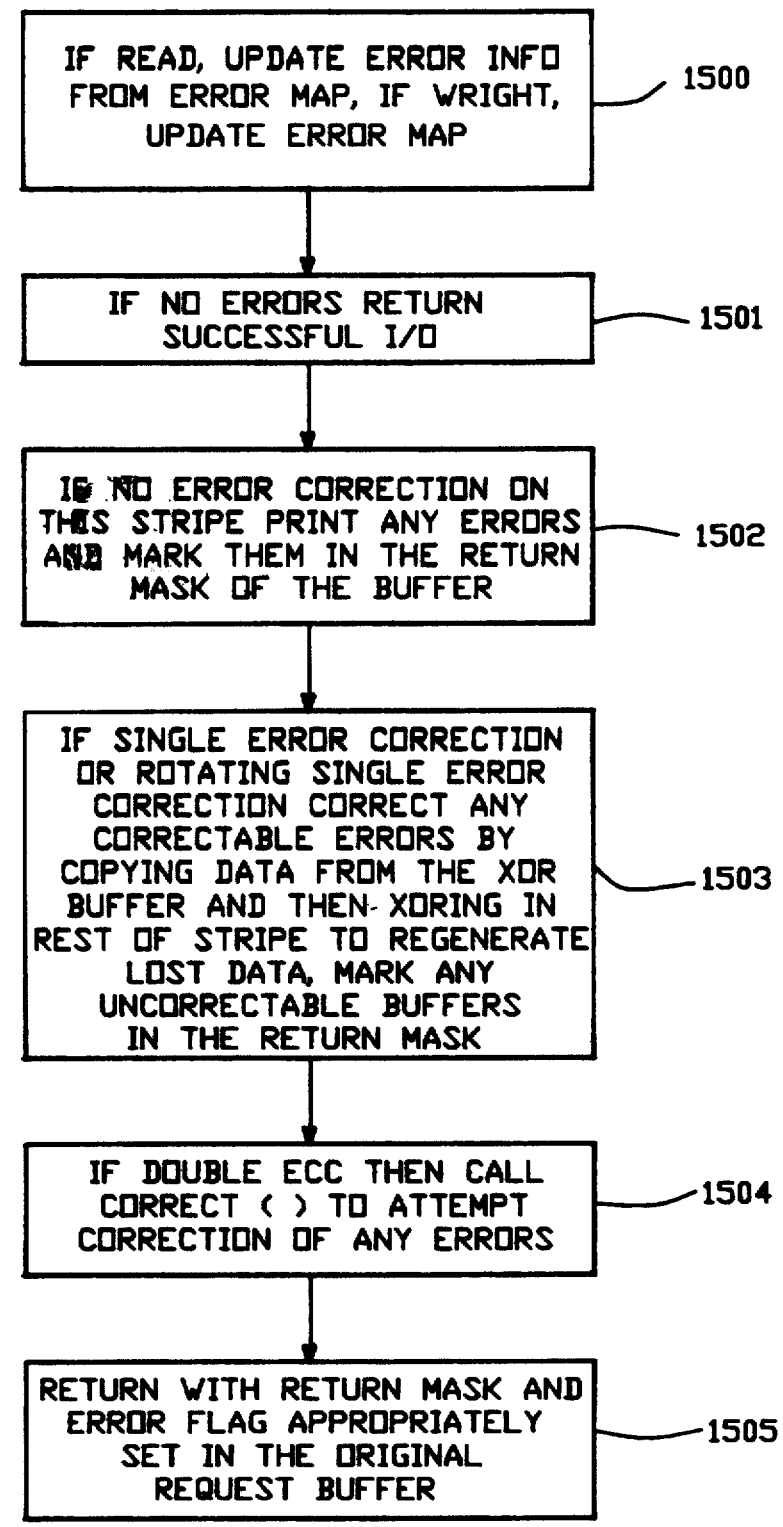
FIG. 18 is a diagram of the recovery routine which operates to recover any lost data reported by the input/output process.

FIG. 18 is the xc_recover routine which is called to attempt to do any necessary error recovery, and set up return values in the buffer. This routine begins in block 1500, where an error history map is maintained for failed I/Os. If a read is done, any error in the read must be corrected from this map. If a write is done, the map is updated so that erroneous data is identified. If no errors are listed in map in block 1500, the routine returns (block 1501). If no error correction is implemented on this data file, any errors are printed and marked in the return mask of the buffer (block 1502). If single error correction or rotating error correction is implemented for this striped file, then any correctable errors are corrected by copying data from the XOR buffer, and then XORing the rest of the cell to regenerate the lost data, any uncorrectable errors are marked in the return mask (block 1503). If double error correction, then the correct() routine is called to attempt to correct any errors (block 1504). Finally, the routine returns with a return mask and the error flag appropriately set in the original request buffer (block 1505).

Figure 19:
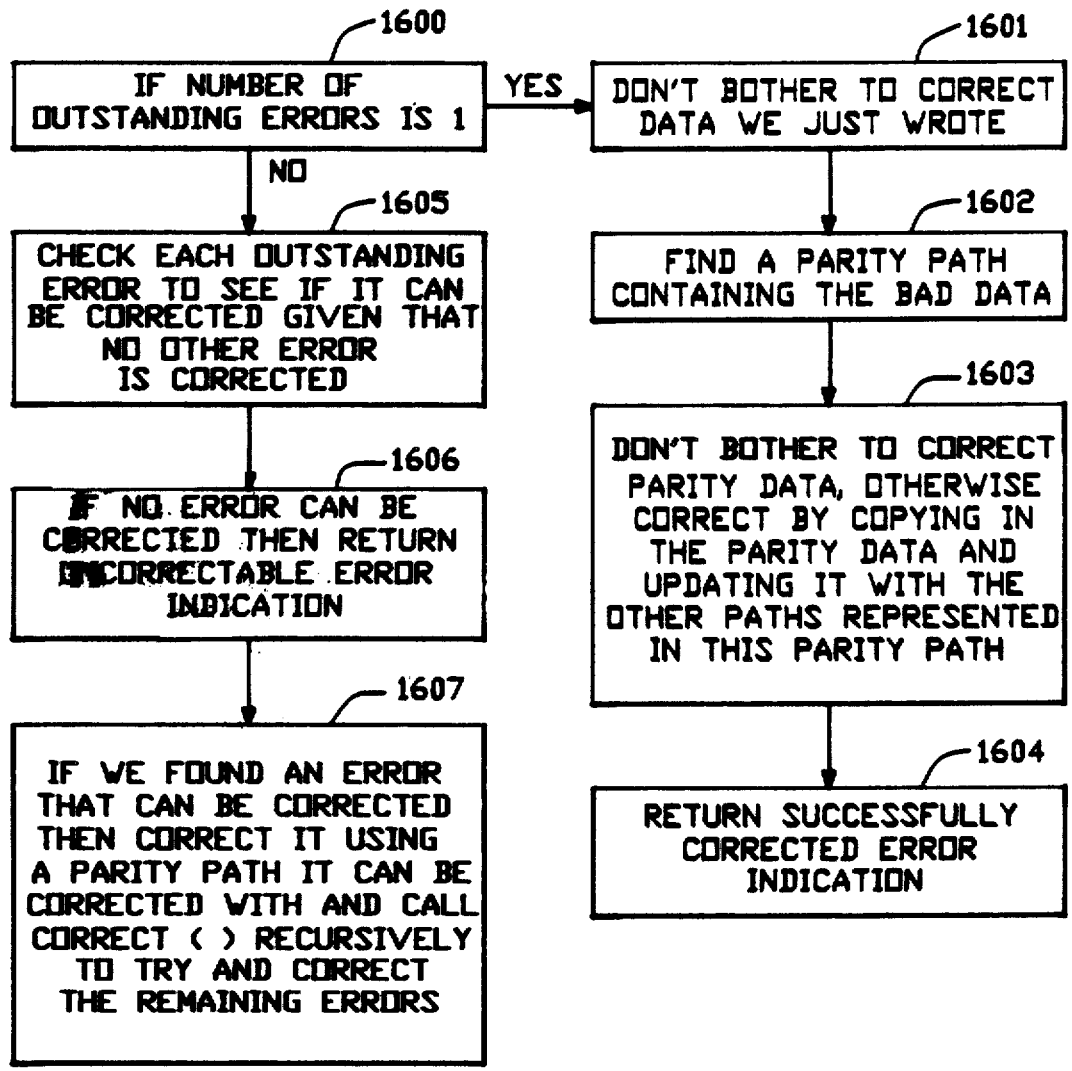
FIG. 19 is a routine for correcting errors for double ECC implementations of the present invention.

FIG. 19 is the correct() routine. This routine begins by determining whether the number of errors detected is one (block 1600). If there is one error and the error is detected in a block of data that has been just written, the routine returns (block 1601). If the error is detected in a path during a read operation, then a parity path reflecting the bad data is found (block 1602). If the bad data is in a parity path, it is not corrected. Otherwise, the parity data is used to correct the error (block 1603). Finally, the successfully corrected error indication is returned (block 1604). If the number of outstanding errors is more than one in block 1600, the algorithm checks each outstanding error to see if it can be corrected, given that no other error is corrected (block 1605). If no error can be corrected, then the routine returns an uncorrectable error signal (block 1606). If an error is found that can be corrected, it is corrected using appropriate parity paths and the correct() routine is recursively called to try to correct the remaining errors (block 1607).

Figure 20:
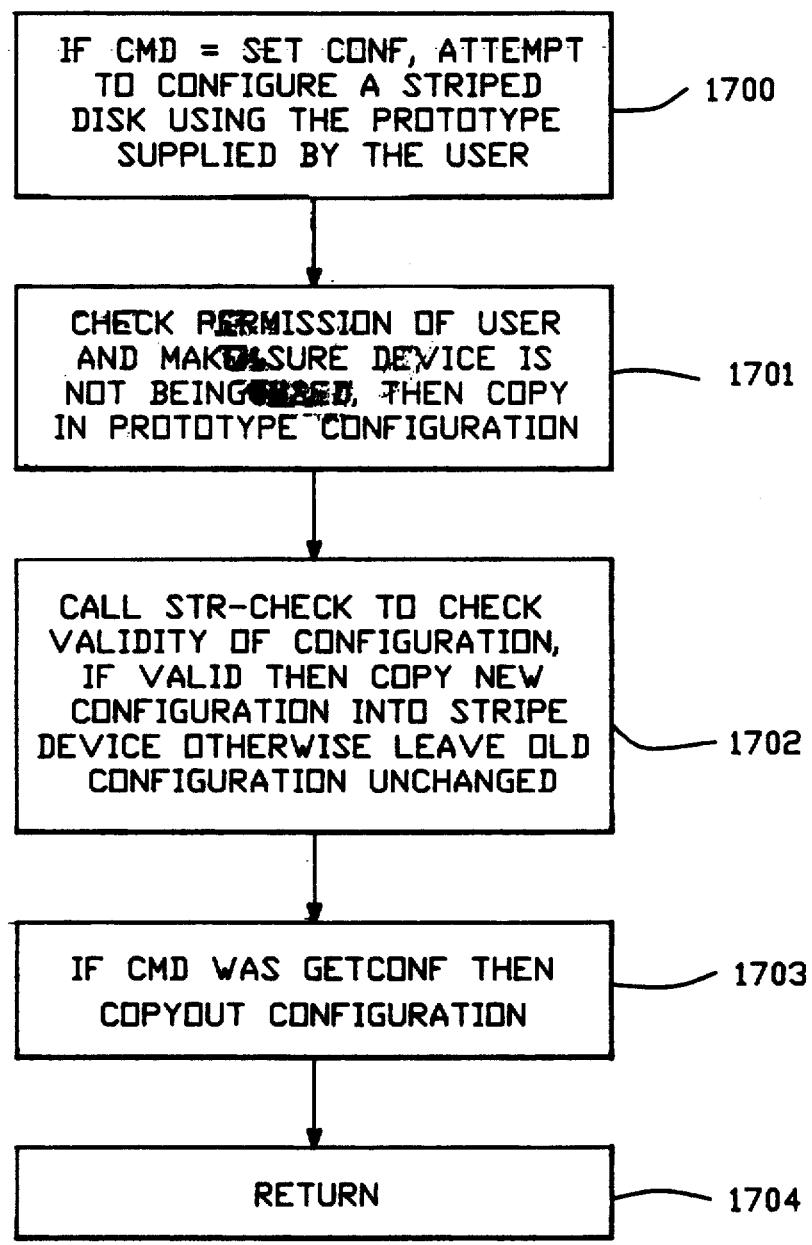
FIG. 20 is an I/O control routine for the striping driver used to configure the system.

FIG. 20 is a routine entitled str_ioctl which does control for the administrative functions necessary. This routine currently only provides the ability to set and get configuration data. This routine begins in block 1700 where it determines whether the command calls for set configuration. If it does, the algorithm attempts to configure a striped device (a cell) from parts of physical devices using the prototype parameters supplied by the user. Next, if the striped device is not being used and the user has proper permission, then prototype configuration is copied (block 1701). Next, the str_check routine is called to check the validity of the configuration, and if valid, the new configuration is copied into the striped device. Otherwise, the old configuration is unchanged (block 1702). If the command was get configuration, then the configuration data is copied out (block 1703). Finally the routine returns (block 1704).

Figure 21:
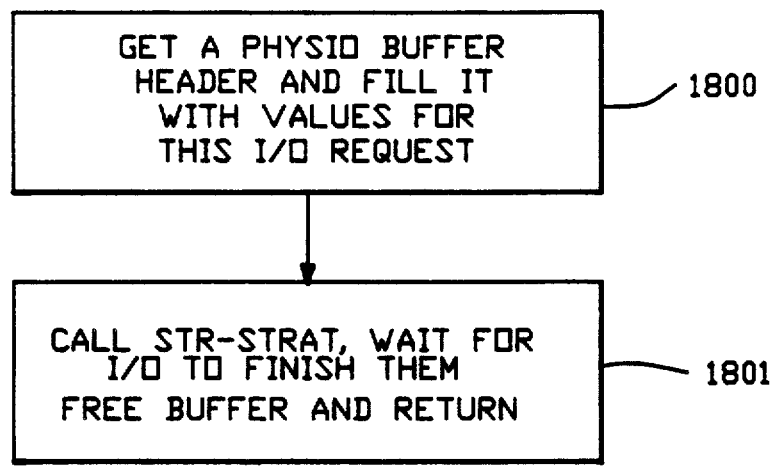
FIG. 21 is the routine for setting up the raw input/output for a striped device.

FIG. 21 is the str physio routine which sets up raw I/O's for a striped device. This operates by getting a physio buffer header and filling it with values for an I/O request (block 1800). Next, the str_strat routine is called and the routine waits for the I/O to finish. Then the buffer is freed and the routine returns (block 1801).

Figure 22:
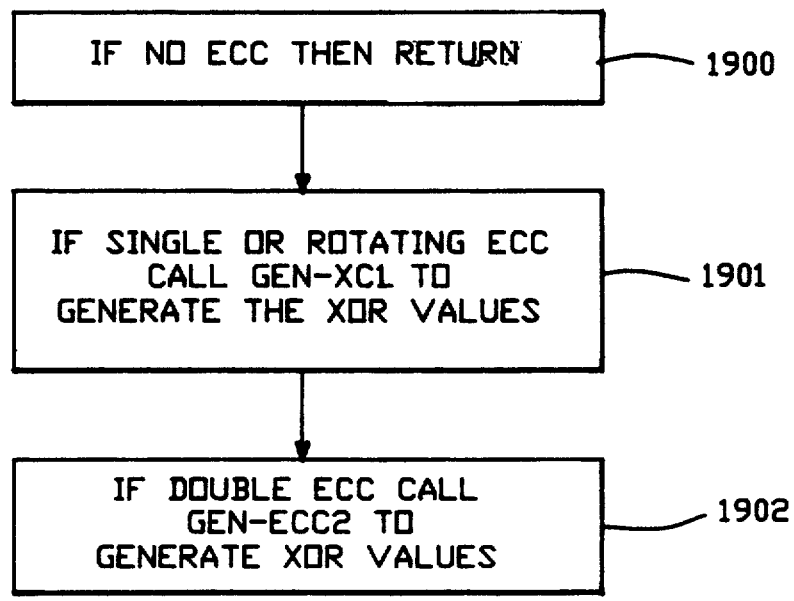
FIG. 22 is a routine for generating the error correction blocks according to user-specified parameters of the level of error correction desired.

FIG. 22 is the gen_ecc routine which generates any ECC data necessary for a striped file as parametrically designated by a user. If no ECC is designated by the user, the routine returns (block 1900). If single or rotating single ECC is parametrically assigned by the user, the routine calls gen_xc1 to generate the correction blocks (block 1901). If double ECC is assigned by the user, the routine calls gen_ecc2 to generate the correction blocks (block 1902).

Figure 23:
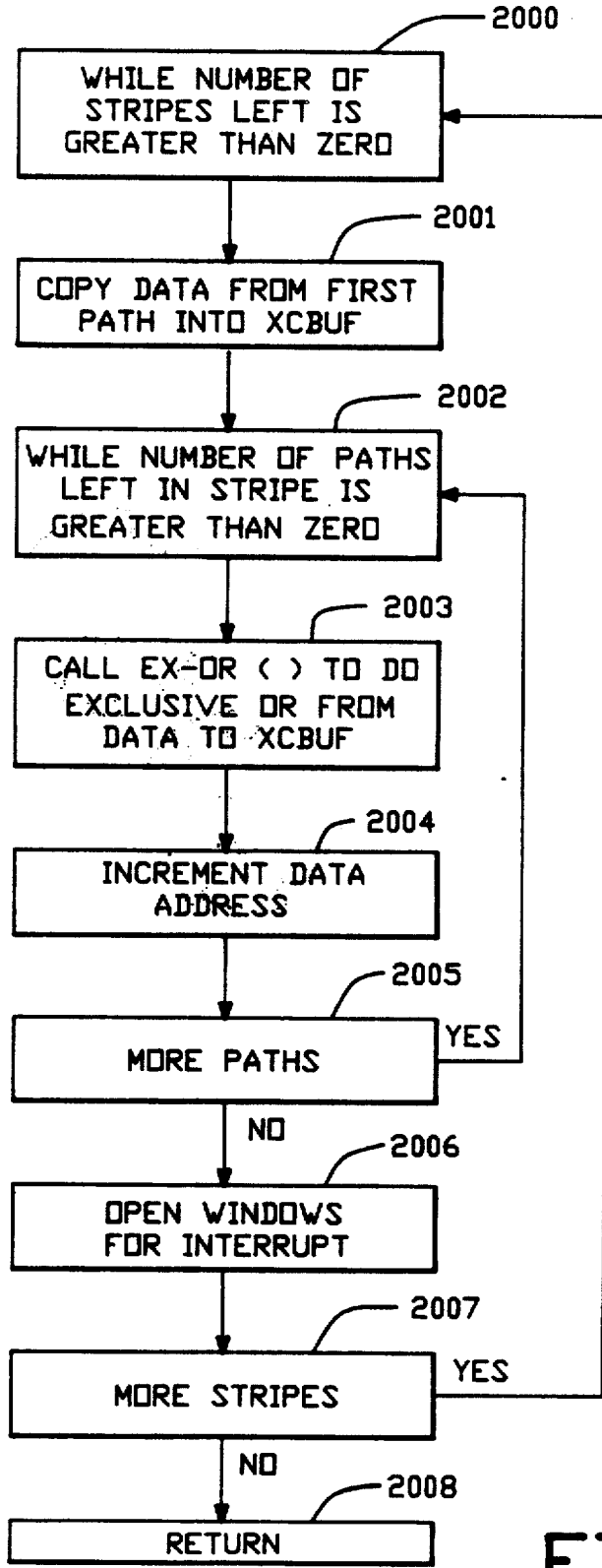
FIG. 23 is a routine for generating parity data for single error correction.

FIG. 23 illustrates the gen_xc1 routine which is used to generate parity data for single error correction on one or more cells. The routine begins in block 2000 while the number of cells is greater than zero. The routine copies data from the first path into an xcbuffer area (block 2001). While the number of local cells (paths) remaining in the cell is greater than zero (block 2002), the routine ex_or() is called to do exclusive-OR from data to the xcbuffer (block 2003). The data address is incremented (block 2004). If there are more local cells (paths) (block 2005), the routine loops to block 2002. If there are no more paths, a window for interrupts is opened (block 2006) and the algorithm determines whether more cells are necessary (block 2007) and loops to block 2000 if there are more. If there are no more cells, the algorithm returns (block 2008).

Figure 24:
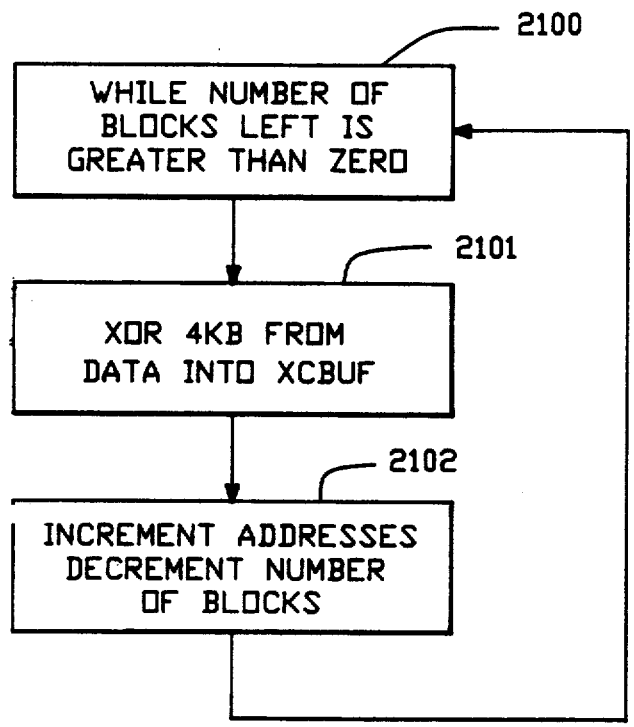
FIG. 24 is the routine for performing exclusive OR from one data area to another.

FIG. 24 illustrates the ex_or routine which does an exclusive OR from one data area to another. In block 2100, while the number of blocks left for the XOR routine is greater than zero, the routine branches to XOR a 4 Kilobyte block of data into the xcbuffer (block 2101). The addresses are incremented and the number of blocks are decremented (block 2102), and the routine loops to block 2100.

Figure 25:
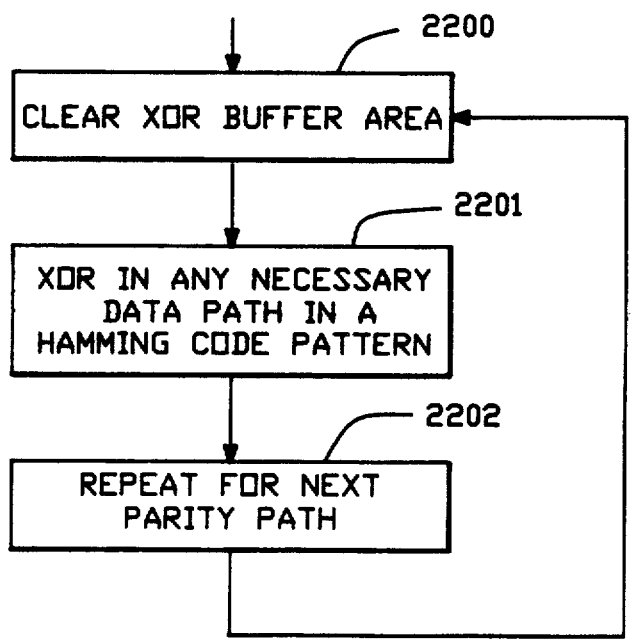
FIG. 25 is the routine for generating double error correction blocks according to the present invention.

FIG. 25 illustrates the gen_ecc2 routine which generates parity values for double error correction. This begins in block 2200 by clearing an xorbuffer area. The necessary local cells are XORed according to the Hamming code pattern utilized. Next, the algorithm repeats for each parity path (block 2202).

Figure 26:
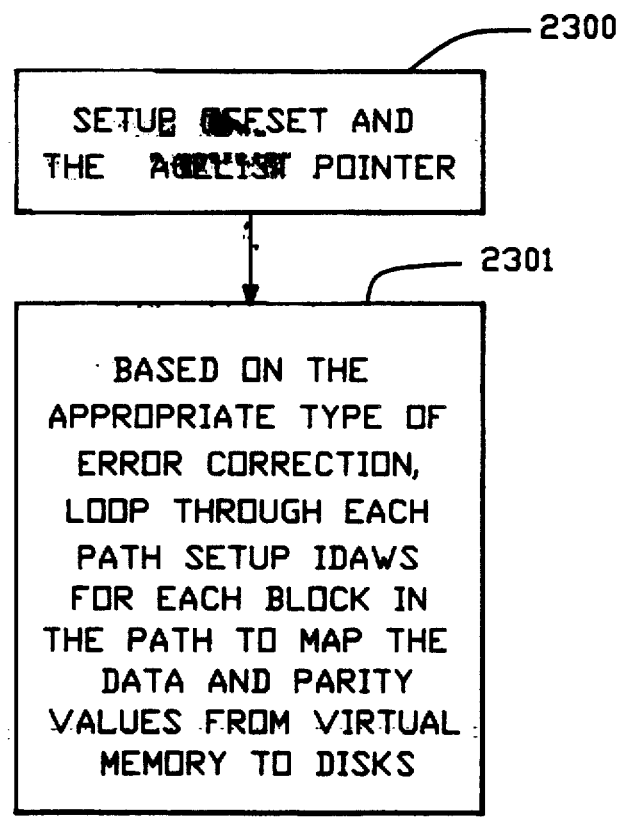
FIG. 26 is the routine for generating the IDAW lists for striped input/output according to the present invention.

FIG. 26 is the routine entitled makeidaws which constructs IDAW lists for striped I/O from a page list generated by the file system. The algorithm begins in block 2300 by setting up the offset and page list pointer. Based on the appropriate type of error correction, the algorithm loops through each path, sets up IDAWS for each block in the path to map the data and parity values from virtual memory to the disks (block 2301).

Source code of key portions of the routine described with reference to FIGS. 16-26 has been provided in Appendices 1, 2 and 3 to the present application, where Appendix 1 includes the routine stripeasm.s (4 pages), Appendix 2 includes the routine stripe.h (4 pages), and Appendix 3 includes the routine stripe.c (83 pages).

Conclusion

A file system according to the present invention, can provide for global optimization of internal storage, usage of a plurality of access paths in parallel for single I/O transaction, and highly efficient allocation of physical storage facilities. Further, the file system can be optimized for continuous operation for users of the data processing system and to a high degree of fault tolerance.

The file system of the present invention exploits the possible parallelism. Additionally it allows adaptation of the file structure to available hardware and operational requirements and adaptation of the access strategy to currently executing tasks.

In addition, by utilization of the storage class concept, a wide variety of data files can be served by a single file system. Further, the storage space allocated by the single file system can be immense.

Storage classes can be defined to match a variety of structures. For instance, a storage class can match the UNIX file structure by limiting the size of the storage class to a physical medium, and setting the depth and width parameters equal to one. This reflects the current UNIX file system structure. This is an important case because it indicates that the described method can be used in such a way that it will perform at least as fast as, and use no more space than the current UNIX file system.

There are many applications that require high speed sequential processing. By defining the depth to reflect device geometries such as track and cylinder size, the speed of individual devices can be adapted to the special needs of the application. Using the Amdahl 6380 class disk system, and setting the depth parameter D to 60 blocks (1 cylinder), a data rate for access of 2 megabytes per second can be achieved with a width equal to one. By setting the width parameter equal to 31, data rates of about 70 megabytes per second have been measured using the system described with reference to FIGS. 16-26.

Operational databases typically require efficient random access to small objects which are contained in blocks, and high sequential speeds for batch processing, image copying and recovery. By using proper storage class definition, the sequential access can be executed as fast as required. The reliability requirements can be satisfied through proper parameters. For instance, a high random update rate may require DUAL or REx, a random update rate may allow SPAR, or PARx.

Non-operational databases, such as CAD/CAM, are often characterized through large objects; for instance, covering several megabytes. Using a storage class that could contain an average object in a few cells would be beneficial to the performance of data access.

According to one preferred storage class, digital data for each file to be manipulated is logically organized into a sequence of W local cells (L1, L2, ... LW) within cells which are mapped to X paths (P1, P2, ... PX). Various methods of mapping local cells to the cells are defined. Well known buffering techniques are employed for each such file (large buffers, multiple buffering, buffers matching track/cylinder size, etc.), so as to maximize bandwidth relative to each path. Error correction blocks allow for immediate and automatic recovery of lost data to a spare path or device in the event of a total device failure, or to a spare location on the same device in the event of a localized failure. Therefore, the method improves very greatly the collective reliability and availability of data in a manner inversely proportional to the probability of a second failure being encountered before recovery of a first is complete for single error correction embodiments.

The foregoing description of the preferred embodiments of the present invention have been presented for purposes of illustration and description. It is not intended to be exhaustive or to limit the invention to the precise form disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

We claim:

1. An apparatus for controlling accesses to data in data files by a plurality of users of a data processing system, the data processing system including internal storage, external storage storing data files, a plurality of access paths between internal storage and external storage, and a file user interface by which the plurality of users request access to data files, the apparatus comprising:

first means, coupled to the file user interface and the internal storage, for allocating the internal storage for temporary storage of current data to be accessed by the plurality of users, for deallocating internal storage from old data stored in the internal storage, and for generating requests for accesses with external storage for transfer of the current data to the allocated internal storage, and of updated old data from the deallocated internal storage; and second means, coupled to the first means and the external storage and responsive to the requests for accesses, for managing transfers between internal storage and external storage through the plurality of access paths.

2. The apparatus of claim 1, wherein the second means includes:

logical mapping means, responsive to the requests for accesses to external storage, for assigning a logical address to data subject of each access, and external mapping means, responsive to the logical address, for mapping the logical address to external storage and carrying out the access subject of the request with external storage.

3. The apparatus of claim 2, wherein there is a plurality of physical storage classes characterized by prespecified parameters that map the logical address of a data file subject of the access to locations in external memory, and the external mapping means includes:

means, responsive to the logical address, for identifying one of the plurality of storage classes; and means, responsive to the identified storage class, for carrying out the access with the locations in external memory to which the prespecified parameters map data files in the identified storage class.

4. The apparatus of claim 3, wherein the second means further includes:

means, responsive to the identified storage class, for generating error codes for data subject of an access for transfer of data from internal storage to external storage; and means, responsive to the identified storage class, for detecting and correcting errors in data subject of an access for transfer of data from external storage to internal storage.

5. The apparatus of claim 3, wherein storage classes in a subset of the plurality of storage classes are characterized by parameters specifying a cell of data, the cell including a plurality of local cells that may be accessed across a plurality of access paths in parallel, a cell of data being specified by a first parameter W defining a number of access paths to corresponding local cells of data for parallel access to a cell, wherein W local cells define a cell, and a second parameter D defining a number of blocks of data from the data files in the storage class within each local cell.

6. The apparatus of claim 5, wherein a block of data is a basic unit of transfer across an access path between external storage and internal storage, and there is at least one block of data in each local cell.

7. The apparatus of claim 5, wherein a block of data is a basic unit of transfer across an access path between external storage and internal storage, and storage classes in a subset of the plurality of storage classes are each further characterized by a reliability parameter that specifies an error recovery algorithm, and the external mapping means further includes:

means, responsive to the reliability parameter, for generating error codes for data subject of an access for transfer of data from internal storage to external storage; and means, responsive to the reliability parameters, for detecting and correcting errors in data subject of an access for transfer of data from external storage to internal storage.

8. The apparatus of claim 5, wherein a block of data is a basic unit of transfer across an access path between external storage and internal storage, and storage classes in a subset of the plurality of storage classes are each further characterized by a reliability parameter that specifies one of a plurality of error recovery algorithms, and the external mapping means further includes:

means, responsive to the reliability parameter, for implementing the error recovery algorithm.

9. The apparatus of claim 8, wherein one of the plurality of error recovery algorithms provides for replication of local cells of data subject of an access for transfer of data from internal storage to external storage, and for storage of replicated local cells in external storage across independent access paths in parallel, and for selection of a best one of replicated local cells of data subject of an access for transfer of data from external storage to internal storage.

10. The apparatus of claim 8, wherein one of the plurality of error recovery algorithms provides for generation of an error code for each cell, and storage of the error code to a local cell within the cell in external storage in parallel with storage of the data subject of an access for transfer of data from internal storage to external storage; and for detection and correction of errors in data subject of an access for transfer of data from external storage to internal storage.

11. The apparatus of claim 8, wherein the error code comprises bitwise parity over the local cells of data within the cell.

12. The apparatus claim 8, wherein for a local cell including N bits, the error code comprises $N \times N$ bit code, where M is a number greater than one, stored in M local cells within the cell.

13. The apparatus of claim 1, wherein the apparatus further includes:

means, coupled to the first means, for specifying dependencies by users on locations in the internal storage allocated to the plurality of users and wherein said first means is responsive to the specified dependencies in allocating and deallocating the internal storage.

14. The apparatus of claim 13, wherein the dependencies specified by the means for specifying are programmable through the data processing system for global balancing of the allocation and deallocation of internal storage for the plurality of users.

15. The apparatus of claim 13, wherein the first means includes:

means, responsive to the dependencies, for locating, journaling and releasing locations to allocate and deallocate the locations in internal storage for the plurality of users.

16. The apparatus of claim 1, wherein there is a plurality of physical storage classes characterized by prespecified parameters that map data files subject of accesses to locations in external memory, and the second means includes:

means, responsive to requests for accesses, for identifying one of the plurality of storage classes assigned to a data file subject of an access; and means, responsive to the identified storage class, for carrying out the access with the locations in external memory to which the prespecified parameters map data files in the identified storage class.

17. The apparatus of claim 16, further including:
   means, coupled to the second means, for assigning data files to storage classes.

18. The apparatus of claim 17, further including means for programming the means for assigning for dynamic allocation of external memory.

19. The apparatus of claim 1, wherein the second means includes means, responsive to a single request for access with external storage, for carrying out the access subject of the request across a subset of the plurality of access paths in parallel.

20. The apparatus of claim 1, wherein there is a plurality of physical storage classes characterized by prespecified parameters that map the data file subject of the access to locations in external memory, and the second means includes:
   means, responsive to a request for access with external storage, for identifying one of the plurality of storage classes assigned to a data file subject of request for access; and
   means, responsive to an identified storage class that maps a data file to a plurality of locations accessible through a subset of the plurality of access paths, for carrying out the access through the subset of the plurality of access paths in parallel.

21. The apparatus of claim 1, wherein there is a plurality of the first means and a plurality of the second means, to support continuous operation in the event of a single point of failure.

22. The apparatus of claim 1, wherein the external storage includes a plurality of physical storage devices, and the second means includes:
   means, independent of the first means, for carrying out transfer of data from data files stored in a first device to a second device in the plurality of physical storage devices.

23. The apparatus of claim 20, wherein the second means further includes:
   means, independent of the first means, for carrying out transfer of data in data files assigned to a first storage class from locations identified in the first storage class to locations identified in a second storage class in the plurality of storage classes.

24. An apparatus for controlling access to data in data files by a plurality of users of a data processing system, the data processing system including internal storage, external storage, a plurality of access paths between internal storage and external storage, and a file user interface by which the plurality of users requests access to data files, wherein there is a plurality of physical storage classes characterized by prespecified parameters that map a data file subject of an access to locations in external memory, the apparatus comprising:
   first means, coupled to the file user interface and the internal storage, for allocating the internal storage for temporary storage of current data in the data files to be accessed by the plurality of users, for deallocating internal storage from old data stored in the internal storage, and for generating requests for accesses with external storage for transfer of current data to allocated internal storage, and of updated old data from deallocated internal storage; and
   means, coupled to the first means, for specifying dependencies by users on locations in the internal storage allocated to the plurality of users, wherein the first means is responsive to the specified dependencies in allocating and deallocating the internal storage;
   logical mapping means, responsive to the requests for accesses with external storage, for assigning a logical address to data subject of each access;
   external mapping means, responsive to the logical address, for identifying one of the plurality of storage classes; and
   means, responsive to the identified storage class, for carrying out the access with the appropriate locations in external memory through a subset of the plurality of access paths.

25. The apparatus of claim 24, wherein the first means includes:
   means, responsive to the dependencies, for locating, journaling and releasing locations to allocate and deallocate the locations in internal storage for the plurality of users.

26. The apparatus of claim 24, wherein the dependencies specified by the means for specifying are programmable through the data processing system for global balancing of the allocation and deallocation of internal storage for the plurality of users.

27. The apparatus of claim 24, wherein the means for carrying out the access is responsive to a single request for access with external storage to transfer data across a subset of the plurality of access paths in parallel.

28. The apparatus of claim 27, wherein storage classes in a subset of the plurality of storage classes are characterized by parameters specifying a cell of data, the cell including a plurality of local cells that may be accessed across a plurality of access paths in parallel, a cell of data being specified by a first parameter W defining a number of access paths to corresponding local cells of data for parallel access to a cell, wherein W local cells define a cell, and a second parameter D defining a number of blocks of data in the data files in the storage class within each local cell.

29. The apparatus of claim 28, wherein a block of data is a basic unit of transfer across an access path between external storage and internal storage, and there is at least one block of data in each local cell.

30. The apparatus of claim 24, wherein the means for carrying out accesses with external storage further includes:
   means, responsive to the identified storage class, for generating error codes for data subject of an access for transfer of data from internal storage to external storage; and
   means, responsive to the identified storage class, for detecting and correcting errors in data subject of an access for transfer of data from external storage to internal storage.

31. The apparatus of claim 28, wherein a block of data is a basic unit of transfer across an access path between external storage and internal storage, and storage classes in a subset of the plurality of storage classes are each further characterized by a reliability parameter that specifies an error recovery algorithm, and the means for carrying out accesses with external storage further includes:
   means, responsive to the reliability parameter, for generating error codes for data subject of an access for transfer of data from internal storage to external storage; and
   means, responsive to the reliability parameter, for detecting and correcting errors in data subject of an access for transfer of data from external storage to internal storage.

32. The apparatus of claim 28, wherein a block of data is a basic unit of transfer across an access path between external storage and internal storage, and storage classes in a subset of the plurality of storage classes are each further characterized by a reliability parameter that specifies one of a plurality of error recovery algorithms, and the means for carrying out accesses with external storage further includes:

means, responsive to the reliability parameter, for implementing the error recovery algorithm.

33. The apparatus of claim 32, wherein one of the plurality of error recovery algorithms provides for replication of local cells of data subject of an access for transfer of data from internal storage to external storage, and for storage of replicated local cells in external storage across independent access paths in parallel, and for selection of a best one of replicated local cells of data subject of an access for transfer of data from external storage to internal storage.

34. The apparatus of claim 32, wherein one of the plurality of error recovery algorithms provides for generation of an error code for each cell, and storage of the error code to a local cell within the cell in external storage in parallel with storage of the data subject of an access for transfer of data from internal storage to external storage; and for detection and correction of errors in data subject of an access for transfer of data from external storage to internal storage.

35. The apparatus of claim 32, wherein the error code comprises bitwise parity over the local cells of data within the cell.

36. The apparatus of claim 32, wherein for a local cell including N bits, the error code comprises a $N \times N$ bit code, where M is a number greater than one, stored in M local cells within the cell.

37. An apparatus in communication with a data processing system for storing a data file for sequential transfers to the data processing system, the data file including a plurality of local cells, each local cell including at least one block of data, wherein a block is a basic unit of transfer between the data processing system and the apparatus, the apparatus comprising:

a plurality of storage means for storing data;
a plurality of logical input/output paths $P_n$, for n equal to 1 through N, each path coupled to a subset of the plurality of storage means and to the data processing system, so that local cells of data may be transmitted in parallel through the N paths between the data processing system and the plurality of storage means; and wherein
the local cells in the data file are stored in the plurality of storage means in a sequence of local cells $LC_i$, for i equal to 1 to X, and wherein local cell $LC_i$ is stored in a storage $P_{n+k}$ means coupled to path $P_n$; and local cell $LC_{i+l}$ is stored in a storage means coupled to path $P_{n+k}$, where k is not equal to zero.

38. The apparatus of claim 37, wherein the data file includes S cells of data, each cells including W local cells, where W is less than or equal to N and S equals X/W rounded to the next higher integer, each cell including at least one local cell storing an error correction code for the cell, and all local cells in a given cell stored in storage means coupled to different paths.

39. The apparatus of claim 38, wherein the error correction code for a given cell comprises a bitwise exclusive-OR of all local cells in the cell, except the error correction code.

40. The apparatus of claim 39, wherein the local cells in the data file containing the error correction codes are stored in storage means coupled to a single path.

41. The apparatus of claim 39, wherein the local cell in the data file containing the error correction code for cell j, is stored in a storage means coupled to path $P(((j-1) \bmod W)+1)$.

42. The apparatus of claim 38, wherein each local cell includes L bits, and the error correction code comprises a $L \times M$ bit code, where M is an integer greater than one.

43. An apparatus in communication with a data processing system for storing a data file for sequential transfers to the data processing system, the data file including a plurality of local cells, each local cell including at least one block of data that can be manipulated by the data processing system as a unit for access to the data file, the apparatus comprising:

a plurality of storage means for storing data;
a number W of logical input/output paths, path 1 through path W, each path coupled to a subset of the plurality of storage means and to the data processing system, so that blocks of data may be transmitted in parallel through the W paths between the data processing system and the plurality of storage means; and wherein
the data file is stored in the plurality of storage means in a sequence of X local cells, and local cell 1 in the sequence is stored in a storage means coupled to path 1, local cell 2 is stored in a storage means coupled to path 2, local cell W is stored in a storage means coupled to Path W, local cell W+1 is stored in a storage means coupled to path 1, local cell W+2 is stored in a storage means coupled to path 2, local cell 2W is coupled to a storage means coupled to path W, and local cell X is stored in a storage means coupled to path $(((X-1) \bmod W)+1)$.

44. The apparatus of claim 43, wherein the data file includes S cells of data, each cell including up to W local cells, where S equals X/W rounded to the next higher integer, each cell including at least one local cell storing an error correction code for the cell.

45. The apparatus of claim 44, wherein the error correction code for a given cell comprises a bitwise exclusive-OR of all local cells in the cell, except, for the local cell storing the error correction code.

46. The apparatus of claim 45, wherein the local cells in the data file containing the error correction codes are stored in storage means coupled to a single path.

47. The apparatus of claim 45, wherein the local cell in the data file containing the error correction code for cell j, is stored in a storage means coupled to path $P(((j-1) \bmod W)+1)$.

48. The apparatus of claim 44, wherein each local cell includes L bits, and the error correction code comprises a $L \times M$ bit code, where M is an integer greater than one.

49. An apparatus in communication with a data processing system for storing a data file for sequential transfers to the data processing system, the data file including a sequence of local cells $LC_i$ for i equal to 1 through X, each local cell including at least one block of data that can be manipulated as a unit by the data processing system for access to the data file, the apparatus comprising:

a plurality of storage means for storing data;

a plurality of logical input/output paths $P_n$, n equal to 1 through W, each path coupled to a subset of the plurality of storage means and to the data processing system, so that blocks of data may be transmitted in parallel through the plurality of paths between the data processing system and the plurality of storage means; and means, coupled to the plurality of paths, for allocating the sequence of local cells $LC_i$, for i equal to 1 to X, to at least a subset of the plurality of storage means, so that local cell $LC_i$ is stored in a storage means coupled to path $P_n$, local cell $LC_{i+1}$ is stored in a storage means coupled to path $P_{n+k} P_k$, where k is not equal to zero.

50. The apparatus of claim 49, wherein local cell $LC_i$ is stored in a storage means coupled to path $P_n$, and n is equal to $(((i-1) \mod W)+1)$, for i equal to 1 to X.

51. An apparatus in communication with a data processing system for storing a data file for sequential transfers to the data processing system, the data file including a sequence of local cells $LC_i$, for i equal to 1 through X, each local cell including at least one block of data that can be manipulated as a unit through the data processing system by users of the data file, the apparatus comprising:

a plurality of storage means for storing data;

a plurality of logical input/output paths $P_n$, for n equal to 1 through W, each path coupled to a subset of the plurality of storage means and to the data processing system, so that blocks of data may be transmitted in parallel through the plurality of paths between the data processing system and the plurality of storage means;

means, coupled to the plurality and paths to receive the blocks of data, for generating an error correction code $ECC_s$ for each set s of E local cells, where s goes from 1 to S, and S is equal to X/E rounded to the next larger integer; and means, coupled to the plurality of paths and to the means for generating an error correction code $ECC_s$, for mapping the sequence of local cells $LC_i$, for i equal to 1 to X, and error correction codes $ECC_s$, for s equal to 1 to S, to at least a subset of the plurality of storage means, so that all local cells in the set s, and error correction code $ECC_s$, define a cell, and local cells in the cell and each are stored in storage means coupled to different paths.

52. The apparatus of claim 51, wherein the error correction codes $ECC_s$ are generated by taking the bitwise exclusive-OR of all local cells of data in the cell.

53. The apparatus of claim 52, wherein the means for mapping maps all error correction codes to storage means coupled to a single path.

54. The apparatus of claim 52, wherein the means for mapping maps error correction code $ECC_s$ to a storage means coupled to path $P_{(((s-1) \mod W)+1)}$ 55. The apparatus of claim 51, wherein the error correction codes are multiple bit Hamming codes.

56. The apparatus of claim 51, wherein the error correction code $ECC_s$ has a size equal to M local cells, and E is equal to W minus M.

57. An apparatus in communication with a data processing system for storing a plurality of data files for sequential transfers to the data processing system, each data file including a sequence of local cells $LC_i$, for i equal to 1 through X, where X is a parameter associated with each data file, each local cell including at least one block of data that can be manipulated as a unit through the data processing system by users of the data file, the apparatus comprising:

a plurality of storage means for storing data;

a plurality of logical input/output paths $P_n$, n equal to 1 through N, each path coupled to a subset of the plurality of storage means and to the data processing system, so that data may be transmitted in parallel through the plurality of paths between the data processing system and the plurality of storage means; and means, coupled to the plurality of paths and to the data processing system, and responsive to parameters associated with each data file by the data processing system, for mapping the sequence of local cells $LC_i$, for i equal to 1 to X, for each data file to at least a subset of the plurality of storage means, so that local cell $LC_i$ of a given data file is stored in a storage means coupled to path $P_n$, and local cell $LC_{i+1}$ of the given data file is stored in a storage means coupled to path $P_k$, where k is not equal to n.

58. The apparatus of claim 57, wherein the number of blocks per local cell is an additional parameter associated with each data file by the data processing system, and to which the means for mapping is responsive.

59. The apparatus of claim 57, wherein a number W of local cells equal a cell, and the number W is an additional parameter associated with each data file by the data processing system.

60. The apparatus of claim 59, wherein local cell $LC_i$ is stored in a storage means coupled to $P_n$, and n is equal to $(((i-1) \mod W)+1)$, for i equal to 1 to X.

61. An apparatus in communication with a data processing system for storing a plurality of data files for sequential transfers to the data processing system, each data file including a sequence of local cells $LC_i$, for i equal to 1 through X, where X is a parameter associated with each data file, N local cells equal a cell, and each local cell includes at least one block of data that can be manipulated as a unit through the data processing system by users of the data file, the apparatus comprising:

a plurality of storage means for storing data;

a plurality of logical input/output paths $P_n$, n equal to 1 through N, each path coupled to a subset of the plurality of storage means and to the data processing system, so that data may be transmitted in parallel through the plurality of paths between the data processing system and the plurality of storage means;

means, coupled to the plurality of paths and the data processing system to receive the blocks of data, for generating and error correction code $ECC_s$, for storage in Z local cells, for a set s of E local cells of data, where s goes from 1 to S, and S equal to X/E rounded to the next larger integer, and N is equal to Z+E; and means, coupled to the plurality of paths and to the data processing system, and responsive to the parameters associated with each data file by the data processing system, for mapping the sequence of local cells $LC_i$, for i equal to 1 to X, and the error correction codes $ECC_s$, for s equal to 1 to S, for each data file to a subset of the plurality of storage means, so that all local cells of data in a given set and the local cells or error correction codes for the given set equal a cell of W local cells and each local cell in a cell is stored in storage means coupled to different paths.

62. The apparatus of claim 61, wherein the number of blocks per local cell is an additional parameter associated with each data file by the data processing system, and to which the means for mapping is responsive.

63. The apparatus of claim 61, wherein W is a parameter associated with each data file by the data processing system.

64. The apparatus of claim 61, wherein there is a plurality of types or error correction codes, and the type of error correction code is a parameter associated with each data file by the data processing system.

65. The apparatus of claim 64, wherein a first type of error correction code is generated by taking the bitwise exclusive-OR of all local cells in the set.

66. The apparatus of claim 64, wherein a first type of error correction code is generated by taking the bitwise exclusive-OR of all local cells in the set, and the means for mapping maps all error correction codes to storage means coupled to a single path.

67. The apparatus of claim 64, wherein a second type of error correction code is generated by taking the bitwise exclusive-OR or all local cells in the set, and the means for mapping maps error correction code $ECC_s$ to a storage means coupled to path $P_{(((s-1) mod W)+1)}$.

68. The apparatus of claim 64, wherein one type of the error correction codes is a multiple bit Hamming code generated over all local cells in the set.

* * * * *

UNITED STATES PATENT AND TRADEMARK OFFICE
CERTIFICATE OF CORRECTION

PATENT NO. : 4,993,030
DATED : February 12, 1991
INVENTOR(S) : Arno S. Krakauer et al.

It is certified that error appears in the above-indentified patent and that said Letters Patent is hereby corrected as shown below:

Column 25, line 56, delete "$P_{n+k}$".

Column 25, line 57, "$LC_{i+1}$" should be --$LC_{i+1}$--.

Column 25, line 61, "cells" should be --cell--. (2nd occurrence)

Column 26, line 47, after "except" delete the comma ",".

Column 27, line 13, delete "$P_k$".

Column 27, line 34, "and" should be --of--.

Column 27, line 46, delete "and each" and after "are" insert --each--.

Column 28, line 31, after "to" insert --path--.

Column 28, line 65, "or" should be --of--.

Column 29, line 9, "or" should be --of--.

Column 30, line 8, "or" should be --of--.

Signed and Sealed this

Thirty-first Day of March, 1998

Attest:

BRUCE LEHMAN

Attesting Officer

Commissioner of Patents and Trademarks